US012067698B2

(12) United States Patent
Prince et al.

(10) Patent No.: US 12,067,698 B2
(45) Date of Patent: *Aug. 20, 2024

(54) MACHINE LEARNING PROCESSING OF CONTIGUOUS SLICE IMAGE DATA

(71) Applicant: THE JOHNS HOPKINS UNIVERSITY, Baltimore, MD (US)

(72) Inventors: Jerry Prince, Timonium, MD (US); Can Zhao, Baltimore, MD (US); Aaron Carass, Towson, MD (US)

(73) Assignee: THE JOHNS HOPKINS UNIVERSITY, Baltimore, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/350,816

(22) Filed: Jul. 12, 2023

(65) Prior Publication Data
US 2023/0360179 A1    Nov. 9, 2023

Related U.S. Application Data

(63) Continuation of application No. 17/274,901, filed as application No. PCT/US2019/051035 on Sep. 13, 2019, now Pat. No. 11,741,580.

(Continued)

(51) Int. Cl.
*G06T 5/00*     (2024.01)
*G06F 18/214*   (2023.01)
(Continued)

(52) U.S. Cl.
CPC ............ *G06T 5/73* (2024.01); *G06F 18/2148* (2023.01); *G06N 3/045* (2023.01); *G06T 7/0012* (2013.01);
(Continued)

(58) Field of Classification Search
CPC ..... G06T 5/003; G06T 7/0012; G06V 10/454; G06V 10/82; G06V 10/774; G06F 18/2148; G06N 3/045
(Continued)

(56) References Cited

U.S. PATENT DOCUMENTS

2009/0005679 A1*  1/2009  Dala-Krishna ........... G06T 7/80
                                                            600/437
2009/0226067 A1*  9/2009  Souza .................... G06T 3/4069
                                                            382/131

(Continued)

OTHER PUBLICATIONS

International Search Report and Written Opinion in corresponding International Application No. PCT/US2019/051035 mailed on Dec. 19, 2019, 6 pages.

(Continued)

*Primary Examiner* — Van D Huynh
(74) *Attorney, Agent, or Firm* — MH2 TECHNOLOGY LAW GROUP LLP

(57) ABSTRACT

Disclosed techniques for image processing three-dimensional image data include: obtaining three-dimensional image data representing contiguous slices parallel to a plane, constructing training data from the image data by, for each of a plurality of angles: rotating the image data in the plane to produce rotated image data, blurring the rotated image data in a dimension parallel to the plane to produce low resolution rotated image data, and introducing aliasing into the low resolution rotated image data in the dimension parallel to the plane to produce aliased low resolution rotated image data, training an anti-aliasing neural network with the aliased low resolution image data and the low resolution image data, training a super-resolution neural network with the aliased low resolution image data and the rotated image data, and processing the image data using the (Continued)

trained anti-aliasing neural network and the trained super-resolution neural network to produce processed image data.

20 Claims, 13 Drawing Sheets

Related U.S. Application Data

(60) Provisional application No. 62/731,537, filed on Sep. 14, 2018.

(51) Int. Cl.
<br>　　　*G06N 3/045*　　　(2023.01)
<br>　　　*G06T 5/73*　　　(2024.01)
<br>　　　*G06T 7/00*　　　(2017.01)
<br>　　　*G06V 10/44*　　　(2022.01)
<br>　　　*G06V 10/774*　　　(2022.01)
<br>　　　*G06V 10/82*　　　(2022.01)

(52) U.S. Cl.
<br>　　　CPC .......... *G06V 10/454* (2022.01); *G06V 10/774* (2022.01); *G06V 10/82* (2022.01); *G06T 2207/10088* (2013.01)

(58) Field of Classification Search
<br>　　　USPC .......................................................... 382/156
<br>　　　See application file for complete search history.

(56) References Cited

U.S. PATENT DOCUMENTS

| | | | | |
|---|---|---|---|---|
| 2012/0189180 | A1* | 7/2012 | Yeluri | G16H 30/40 382/128 |
| 2013/0129198 | A1* | 5/2013 | Sherman | G16H 30/20 382/159 |
| 2018/0143281 | A1* | 5/2018 | Sofka | G06T 7/0012 |
| 2020/0011951 | A1* | 1/2020 | Shi | G01R 33/56536 |
| 2020/0034948 | A1* | 1/2020 | Park | G06N 3/088 |
| 2020/0397334 | A1* | 12/2020 | Fang | A61B 5/7267 |
| 2021/0042883 | A1* | 2/2021 | Zhang | G01R 33/565 |
| 2022/0130017 | A1* | 4/2022 | Zhang | A61B 5/7267 |

OTHER PUBLICATIONS

International Preliminary Report on Patentability in corresponding Application No. PCT/US2019/051035 mailed on Mar. 9, 2021, 5 pages.
Greenspan et al., Super-resolution in medical imaging., The computer journal., (2009), pp. 43-63, vol. 52.
Van Reeth et al., Super-resolution in magnetic resonance imaging: A review., Concepts in Magnetic Resonance Part A., (2012), pp. 306-325, vol. 40.
Park et al., Super-resolution image reconstruction: a technical overview., IEEE Signal Processing Magazine., (2003), pp. 21-36, vol. 20.
Scherrer et al., Super-resolution reconstruction to increase the spatial resolution of diffusion weighted images from orthogonal anisotropic acquisitions., Medical Image Analysis., (2012), pp. 1465-1476, vol. 16.
Woo et al., Reconstruction of high-resolution tongue vols. from Mri., IEEE Trans Biomed Eng., (2012), pp. 3511-3524, vol. 59.
Bai et al., Super-resolution reconstruction of MR brain images., Proc of 38-th Annul conference on information sciences and systems., (2004), pp. 1358-1363.

Plenge et al., Super-resolution methods in MRI: Can they improve the trade-off between resolution, signal-to-noise ratio, and acquisition time?, Magnetic Resonance in Medicine, (2012), pp. 1983-1993, vol. 68.
Delbracio et al., Removing Camera Shake via Weighted Fourier Burst Accumulation., IEE Transactions on Image Processing., (2015), vol. 24.
Chang et al., Super-resolution through neighbor embedding., Computer vision and pattern recognition., (2004), pp. I-I.
Timofte et al., Anchored Neighborhood Regression for Fast Example-Based Super-Resolution., 2013 IEEE International Conference on Computer Vision (Iccv), (2013), pp. 1920-1927.
Timofte et al., A plus: Adjusted Anchored Neighborhood Regression for Fast Super-Resolution., Computer Vision., (2015), pp. 111-126, vol. 9006.
Schulter et al., Fast and accurate image upscaling with super-resolution forests., Proceedings of the IEE Conference on Computer Vision and Pattern Recognition., (2015), pp. 3791-3799.
Salvador et al., Naïve Bayes super-resolution forest., Proceedings of the IEEE International conference on Computer Vision., (2015), pp. 325-333.
Hertzmann et al., Image analogies., Proceedings of the 28th annual conference on Computer graphics and interactive techniques., (2001), pp. 327-340.
Liang et al., Incorporating image priors with deep convolutional neural networks for image super-resolution., Neurocomputing., (2016), pp. 340-347, vol. 194.
Dong et al., Image super-resolution using deep convolutional networks., IEEE Transactions on Pattern Analysis and Machine Intelligence., (2016), pp. 295-307, vol. 38.
Jog et al., Self Super-Resolution for Magnetic Resonance Images., International Conference on Medical Image Computing and Computer-Assisted Intervention., (2016), pp. 553-560.
Goyal et al., Improving self super resolution in magnetic resonance images., Medical imaging 2018: Biomedical applications in Molecular, Structural, and functional imaging., (2018), p. 1057814.
Zhao et al., Self super-resolution for magnetic resonance images using deep networks., Biomedical Imaging., (2018), pp. 365-368.
Lim et al., Enhanced deep residual networks for single image super-resolution., Computer Vision and Pattern recognition workshops (CVPRW)., (2017), pp. 1132-1140.
Unser et al., Splines: A perfect fit for signal and image processing., IEEE Signal Processing Magazine., (1999), pp. 23-38, vol. 16.
Vu et al., S3: A spectral and spatial sharpness measure., Advances in Multimedia., (2009), pp. 37-43.
Shao et al., Shortcomings of ventricle segmentation using deep convolutional networks., Understanding and interpreting machine learning in medical image computing applications., (2018), pp. 78-86.
Zhao et al. A deep learning based anti-aliasing self super-resolution algorithm for MRI. MICCAI., (2018), pp. 100-108.
Delbracio et al., Hand-held video deblurring via efficient fourier aggregation., IEEE Transactions on computational imaging., (2015), pp. 270-283, vol. 1(4).
Huang et al., Single Image Super-Resolution From transformed self-exemplars., CVPR., (2015), pp. 5197-5206.
Kim et al., Accurate image super-resolution using very deep convolutional networks., CVPR., (2016), pp. 1646-1654.
Ledig et al., Photo-realistic single image super-resolution using a generative adversarial network., CVPR., (2017), pp. 4681-4690.
Lusebrink et al., Cortical thickness determination of the human brain using high resolution 3 T and 7 T MRI data., Neuroimage., (2013), pp. 122-131, vol. 70.
Weigert et al., Isotropic reconstruction of 3d fluorescence microscopy images using convolutional neural networks., MICCAI., (2017), pp. 126-134.

* cited by examiner

MACHINE LEARNING PROCESSING OF CONTIGUOUS SLICE IMAGE DATA

RELATED APPLICATIONS

This application is a continuation of U.S. patent application Ser. No. 17/274,901 filed on Mar. 10, 2021, now allowed, which is a national stage entry of International Patent Application No. PCT/US2019/051035, filed on Sep. 13, 2019, published as WO 2020/056274 A1 on Mar. 19, 2020, which claims the benefit of, and priority to, U.S. Provisional Patent Application No. 62/731,537 entitled, "MACHINE LEARNING PROCESSING OF CONTIGUOUS SLICE IMAGE DATA" and filed on Sep. 14, 2018, all of which are hereby incorporated by reference in their entirety.

FIELD

This disclosure relates generally to processing three-dimensional images to improve resolution.

BACKGROUND

High resolution magnetic resonance images are desired in many clinical applications, yet acquiring such data with an adequate signal-to-noise ratio requires a long time, making them costly and susceptible to motion artifacts. A common way to partly achieve this goal is to acquire images with good in-plane resolution and poor through-plane resolution (e.g., relatively large slice thickness). For such two-dimensional imaging protocols, aliasing is also introduced in the through-plane direction, and these high-frequency artifacts cannot be removed by conventional interpolation. Known super-resolution algorithms can reduce aliasing artifacts and improve spatial resolution. State-of-the-art super-resolution methods may be machine-learning based and require external training data consisting of paired low resolution and corresponding high resolution images. However, due to scanner limitations, such training data are often unavailable.

BRIEF DESCRIPTION OF THE DRAWINGS

Various features of the embodiments can be more fully appreciated, as the same become better understood with reference to the following detailed description of the embodiments when considered in connection with the accompanying figures, in which.

DESCRIPTION OF THE EMBODIMENTS

Reference will now be made in detail to example implementations, illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

Some embodiments provide anti-aliasing and super-resolution techniques for processing magnetic resonance and other images. Some embodiments need no external training data. Such embodiments take advantage of the fact that the in-plane slices of those images contain high frequency information. Some embodiments may include the following three parts. First, build an anti-aliasing deep learning network and a super-resolution deep learning network. Second, apply both deep learning networks along different orientations within the original images. Third, recombine the multiple orientations output from the provided by applying the deep learning networks, e.g., using Fourier burst accumulation. Some embodiments utilize no image preprocessing other than inhomogeneity correction, e.g., N4 inhomogeneity correction, and demonstrate significant improvement compared to competing techniques.

I. Description of the Problem

Figure 1:
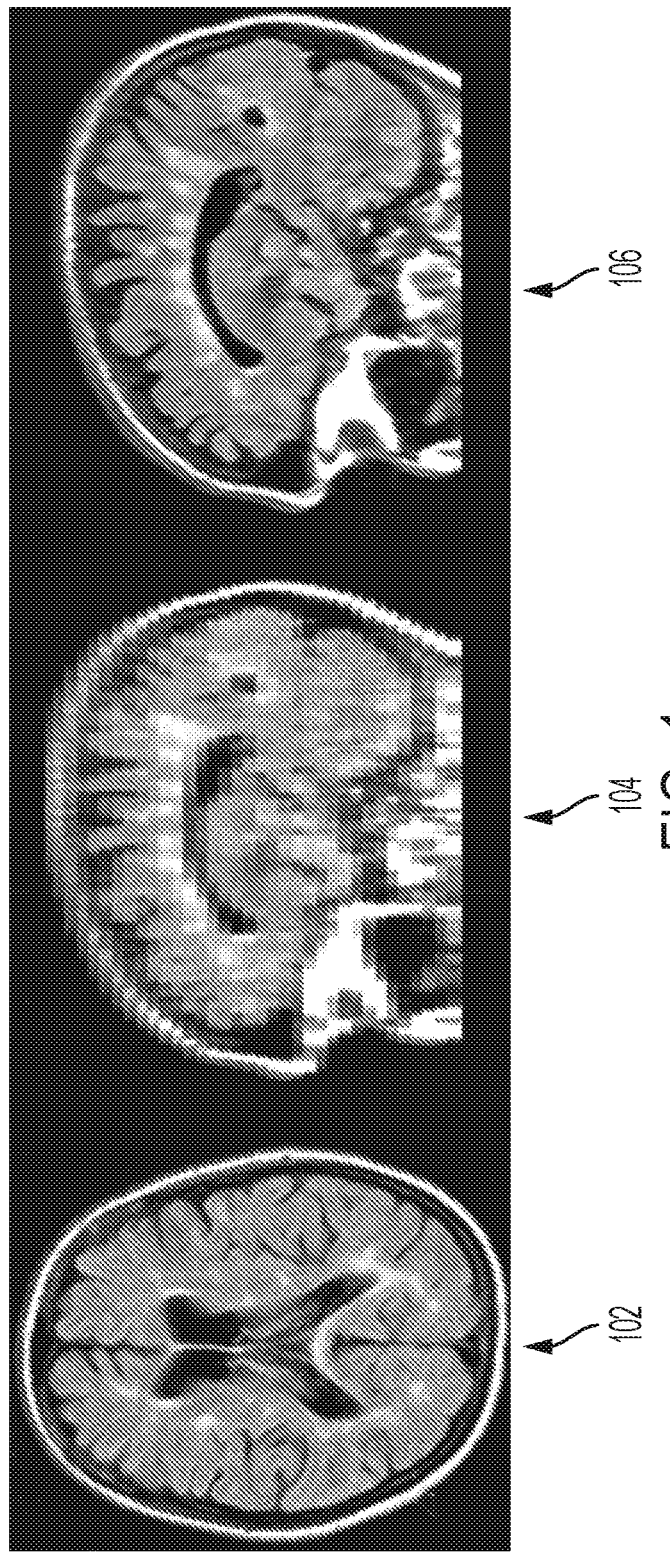
FIG. 1 illustrates a T2-FLAIR magnetic resonance image with an acquired resolution of 1×1×4.4 mm shown in axial and sagittal views, as well as a super-resolution reconstruction according to various embodiments shown in a sagittal view.

FIG. 1 illustrates a T2-FLAIR image with an acquired resolution of 1×1×4.4 mm shown in axial view 102 and sagittal view 104, as well as a super-resolution reconstruction 106 according to various embodiments shown in a sagittal view. In general, magnetic resonance images are known for their exquisite and flexible tissue contrast. Efforts to improve resolution, however, are met with tradeoffs between resolution, speed of acquisition, and noise, and inevitably there are practical limits on the achievable resolution. One very common tradeoff is to acquire images with better in-plane resolution than through-plane resolution (i.e., anisotropic voxels), as shown in FIG. 1 (axial view 102 and sagittal view 104), which results in significant degradation of images reconstructed in the thicker plane. Some embodiments present a novel approach to providing through-plane resolution enhancement using only a single conventionally-acquired anisotropic data set. As an example of what is possible with this approach, some embodiments provide the acquired 3D image volume depicted in FIG. 1 (axial view 102 and sagittal view 104) to generate the super-resolution image volume depicted at super-resolution reconstruction 106.

A variety of embodiments are disclosed herein, including embodiments that include super-resolution techniques without anti-aliasing techniques, as well as embodiments that include both super-resolution techniques and anti-aliasing techniques. Both types of embodiments, as well as other types, are described in detail herein.

There are a host of neuroimaging applications that would benefit from the generation of higher magnetic resonance image resolution using embodiments as disclosed herein. One application that requires high-resolution imaging is imaging the cranial nerves to assess cranial nerve palsy or to plan for skull base mass resection surgery. Applying thinner sections and regional imaging of particular cranial nerve segments using special pulse sequences makes it possible to image many nerve segments; however, visualization of the cisternal trochlear, abducens, and accessory nerves remains challenging due to inadequate resolution and image coverage. Some embodiments allow for acquisition of a substantially thicker 3D slab in the same time period, i.e., covering more anatomy in the current acquisition time, or alternatively a more rapid examination with comparable data. For many clinical applications, it is a challenge to acquire high-resolution images in clinically feasible times, and some embodiments allow not only for improved imaging at academic centers, but also for reducing barriers to the adoption of high resolution imaging in clinical practice more broadly.

High resolution images are also desirable for automatic medical image analysis. For example, cortical thickness is overestimated by popular automatic algorithms (e.g., FreeSurfer and ARCTIC) when applied to magnetic resonance data acquired at 1 mm isotropic resolution (at both 3 T and 7 T field strengths) and at 0.5 mm isotropic resolution (at 7 T only), most likely due to partial volume averaging (which is a direct result of the lower resolution acquisition). Although the effect is lessened at 7 T, such equipment is not widely available and it not as well tolerated as typical magnetic resonance image acquisitions on magnetic resonance image scanners that are more widely available at or below 3 T. This finding has implications for all neuroscientific studies that rely on volumetric computations and could be addressed with some of the disclosed embodiments.

While it is very important to acquire high-resolution magnetic resonance images for visualization of fine anatomical detail, it is no less important to acquire standard clinical magnetic resonance images in less time. Faster magnetic resonance images without loss of quality would have a significant societal health benefit, because more patients could be served per day per scanner, improving access (particularly in underserved areas with few magnetic resonance image scanners) and with potential to reduce cost. Hardware improvements to magnetic resonance scanners have had the greatest impact on imaging speed, yet acquisition and reconstruction methodologies, including post-processing methods such as SENSE, GRAPPA, and compressed sensing, have also contributed to improved imaging speed. Some embodiments reduce magnetic resonance image acquisition time while maintaining quality. Note that embodiments are not limited to imaging of the brain, but rather can be used in any anatomic region.

Heart disease remains the leading cause of death in the U.S. today. Coronary artery disease (CAD), the most common form of heart disease, was responsible for nearly one out of six deaths in the United States in 2006 and coronary imaging is key to early detection. Whole heart coronary artery magnetic resonance angiography (MRA) has emerged as a promising alternative to the current gold standard for detection of CAD, x-ray coronary angiography is a costly and potentially harmful procedure (because of the use of both contrast and x-rays). Importantly, because of the ability to find intrinsic blood contrast in MRA, no contrast is required. A typical coronary MRA is carried out using a free-breathing, navigator-gated, 3D SSFP (steady-state free-precession) pulse sequence on a 1.5 T scanner using radial k-space sampling, yielding a voxel resolution of 1.34×1.34×1.73 mm. Although this is a 3D pulse sequence, an elongated voxel is acquired in order to save time and preserve signal-to-noise ratio. The average imaging time is 9.5 min, which remains a major challenge especially in comparison to multidetector computer tomography, which has more rapid acquisition (and therefore higher patient throughput) and also outperforms MRA in diagnostic accuracy for detecting stenosis. Because of the benefits that could come from routine MRA in screening for CAD, there has been considerable recent effort to improve resolution and/or reduce acquisition time in MRA. Clearly, achieving improved resolution with equal or lower imaging time in coronary artery MRA is highly significant.

Some embodiments provide a novel image post-processing technique to enhance image resolution in order to enable higher resolution scans or to reduce time for standard scans without degrading image quality.

II. Discussion of, and Comparison to, Prior Art Techniques

While magnetic resonance hardware developments over the years—including higher field strengths, parallel transmitting and receiving strategies, and faster gradients—have improved resolution tremendously, there have also been very significant developments in postprocessing for resolution enhancement.

Super-resolution reconstruction (SRR), in particular, has been well-developed and validated in simulations, phantoms, and human studies (see H. Greenspan, "Super-resolution in medical imaging," *The Computer Journal*, vol. 52, pp. 43-63, 2009; E. Van Reeth, I. W. Tham, C. H. Tan, and C. L. Poh, "Super-resolution in magnetic resonance imaging: A review," *Concepts in Magnetic Resonance Part A*, vol. 40, pp. 306-325, 2012; and S. C. Park, M. K. Park, and M. G. Kang, "Super-resolution image reconstruction: a technical overview," *IEEE Signal Processing Magazine*, vol. 20, pp. 21-36, 2003). SRR involves the acquisition of multiple low-resolution scans which are combined in post-processing to achieve a single high resolution scan. Nearly all approaches have focused on improving through-plane resolution using multiple image volumes acquired with poor resolution in one direction (defined as the through-plane direction).

Early efforts considered the acquisition of shifted image stacks. It has been shown that these methods can reduce the effects of through-plane aliasing and can also improve resolution, but only through the impact of inverse filtering (deconvolution) using a known point spread function (PSF), which is a highly ill-posed process.

Later methods exploited acquisition of rotated image stacks (so-called multi-orientation scans), which can take advantage of direct acquisition of higher frequencies in all three Fourier dimensions. See, e.g., B. Scherrer, A. Gholipour, and S. K. Warfield, "Super-resolution reconstruction to increase the spatial resolution of diffusion weighted images from orthogonal anisotropic acquisitions," *Medical Image Analysis*, vol. 16, pp. 1465-1476, 2012; J. Woo, E. Z. Murano, M. Stone, and J. L. Prince, "Reconstruction of high-resolution tongue volumes from MRI," *IEEE Trans Biomed Eng*, vol. 59, pp. 3511-24, December 2012; and Y. Bai, X. Han, and J. L. Prince, "Super-resolution reconstruction of MR brain images," in *Proc. of 38-th Annual Conference on Information Sciences and Systems*, Princeton, New Jersey, 2004, pp. 1358-1363.

A classical SRR algorithm includes three steps: 1) registration of the acquired images, 2) interpolation of these images onto a high-resolution grid, and 3) deconvolution to remove blur and noise. With equal image acquisition time and signal-to-noise ratio (SNR), SRR can indeed improve resolution over direct high-resolution acquisition. See E. Plenge, D. H. Poot, M. Bernsen, G. Kotek, G. Houston, P. Wielopolski, L. van der Weerd, W. J. Niessen, and E. Meijering, "Super-resolution methods in MRI: Can they improve the trade-off between resolution, signal-to-noise ratio, and acquisition time?," *Magnetic Resonance in Medicine*, vol. 68, pp. 1983-1993, 2012.

In computer vision, methods for resolution enhancement involving multiple images have typically been called "multi-image blind deconvolution methods," where the word "blind" implies that the PSF is not known and must be estimated as well. These algorithms tend to be more ill-posed than conventional SRR. To avoid the need to know or estimate the PSF, Fourier burst accumulation (FBA) may be used for multi-image digital camera deblurring. See M. Delbracio and G. Sapiro, "Removing Camera Shake via Weighted Fourier Burst Accumulation," *IEEE Transactions on Image Processing*, vol. 24, November 2015. FBA is conceptually simple: register all acquired images together, take their Fourier transforms, pick the maximum value at each Fourier frequency, and inverse transform the result. Because no deconvolution is attempted, the resulting resolution is at best equal to the Fourier resolution of the pixels in the camera itself. In magnetic resonance imaging, the PSF is generally assumed to be known since it can be inferred from the Fourier resolutions in the readout and phase-encode in-plane directions and either the slice thickness (in 2D acquisitions) or the Fourier resolution in the through-plane direction (in 3D acquisitions). However, for a variety of reasons, the exact PSF often varies from the pulse sequence prescription, so the FBA approach may be used for MRI as well as for digital cameras. In particular, FBA can, in principle be used to recover the in-plane resolution using a collection of rotated MRI acquisitions, each with elongated (e.g., anisotropic) voxels that are oriented in a different direction.

One of the biggest problems in SRR methods—including FBA—is registration of the acquired low resolution images. This is particularly problematic in diffusion weighted SRR, which may require registration to be carried out in q-space. But it is also problematic in conventional T1-weighed imaging simply due to the small geometric irregularities caused by the different orientations of the phase encode directions of the acquired images. Such irregularities, though small, cause blurring of the combined images which leads to artifacts and inadequate resolution recovery. Irregularities in image alignment are further compounded in cases where imaging of motion is desired, such as cardiac imaging and imaging of tongue motion. If one could avoid acquiring multiple low resolution images and still carry out SRR, this would represent a significant advancement since resolution recovery could reach its full potential and considerable image acquisition time could also be saved. Thus, super-resolution from a single image is a highly desirable goal.

Resolution enhancement from only one acquired image is referred to as image deconvolution, image restoration, single-frame image zooming, image upscaling, self super-resolution, and single image super-resolution. Deconvolution is a part of model-based self super-resolution and has a long history in signal and image processing. It has had limited use in medical imaging, however, largely because it is an extremely ill-posed problem and therefore highly susceptible to noise amplification. When the PSF is not known precisely, then deconvolution efforts can produce severe artifacts, most notably so-called ringing artifacts. Blind deconvolution methods have recently undergone a major "renaissance" in recent years, as Bayesian methods to simultaneously estimate the PSF and the deblurred image have led to stable algorithms and excellent results. Unfortunately, the computational burden of these methods is quite large, and it would be extremely challenging to adapt the methods to 3D medical images. As well, these methods depend very strongly on appropriate prior models for natural and man-made scenes in photography, which may not carry over well to anatomical magnetic resonance images. Thus, a challenge is to move away from multiple low resolution acquisitions so that registration is not problematic and acquisition time is lowered, while getting around the ill-posedness and computational burden of these deconvolution approaches.

Example-based methods for all kinds of image processing goals, including noise reduction and super-resolution, largely originating from the machine learning community, have been enjoying great success in the image processing, computer vision, and medical imaging communities. In the most prominent SRR method, examples of both low resolution and high resolution images of the same scene—so-called atlas images—are used as training data to inform us about the likely appearance of the high resolution image given only the low resolution image. See, e.g., H. Chang, D.-Y. Yeung, and Y. Xiong, "Super-resolution through neighbor embedding," in *Computer Vision and Pattern Recognition, 2004. CVPR 2004. Proceedings of the 2004 IEEE Computer Society Conference on*, 2004, pp. I-I; Timofte, V. De Smet, and L. Van Gool, "Anchored Neighborhood Regression for Fast Example-Based Super-Resolution," 2013 *IEEE International Conference on Computer Vision (Iccv)*, pp. 1920-1927, 2013; R. Timofte, V. De Smet, and L. Van Gool, "A plus: Adjusted Anchored Neighborhood Regression for Fast Super-Resolution," *Computer Vision—Accv 2014, Pt Iv*, vol. 9006, pp. 111-126, 2015; S. Schulter, C. Leistner, and H. Bischof, "Fast and accurate image upscaling with super-resolution forests," in *Proceedings of* the IEEE Conference on Computer Vision and Pattern Recognition, 2015, pp. 3791-3799; and J. Salvador and E. Pérez-Pellitero, "Naive Bayes super-resolution forest," in Proceedings of the IEEE International Conference on Computer Vision, 2015, pp. 325-333.

In the method called image analogies, features from small patches within the subject's low resolution image are matched to features from patches in the atlas's low resolution image, and a patch from the atlas's high resolution image corresponding to the best matching low resolution patch is used to synthesize a high resolution image (by spatially tiling many of these high resolution patches). The use of external atlases is known in the example-based super-resolution literature. See A. Hertzmann, C. E. Jacobs, N. Oliver, B. Curless, and D. H. Salesin, "Image analogies," in Proceedings of the 28th annual conference on Computer graphics and interactive techniques, 2001, pp. 327-340; Y. Liang, J. Wang, S. Zhou, Y. Gong, and N. Zheng, "Incorporating image priors with deep convolutional neural networks for image super-resolution," Neurocomputing, vol. 194, pp. 340-347, 2016; and C. Dong, C. C. Loy, K. He, and X. Tang, "Image super-resolution using deep convolutional networks," IEEE Transactions on Pattern Analysis and Machine Intelligence, vol. 38, pp. 295-307, 2016. Use of such external atlases in the present context, however, is problematic because the image contrast and signal-to-noise ratio of the subject image may not be quite the same as that of the atlas. As well, it may not be possible to acquire a high resolution image of suitable quality for an atlas because it would simply take too long.

A known scheme to avoid use of atlases is to assume that images are self-similar across scales. The subject image has its resolution reduced by low-pass filtering, creating a pair of images, one low resolution and one high resolution. Then features from both the low resolution image and the high resolution image are computed and a mapping from the low resolution features to the high resolution features is learned by regression (using a machine learning method). This learnt mapping is then applied to the original subject image features creating features at (presumably) yet a higher resolution than the original image, from which the even higher resolution image is synthesized. The problem with these methods is that the learnt mappings do not truly describe the relationship between the acquired low resolution image and a high resolution image; it is just assumed that the same relationship between features exists at multiple scales, which is not true in general. A variant of this method, called brain hallucination, has been proposed to partially address this problem. It is common in magnetic resonance image protocols to acquire a low resolution T2-weighted image and a high resolution T1-weighted image. T2-weighted images have a tissue contrast that depends largely on the transverse magnetization while T1-weighted images have a tissue contrast that depends largely on the longitudinal magnetization. This dichotomy in resolutions is common because T1-weighted images can generally be acquired faster than T2-weighted images while still yielding adequate image quality. Brain hallucination runs the high resolution T1-weighted image through a low pass filter and learns a mapping between the low resolution features and the original image; it then applies this mapping to the T2-weighted image to find a high resolution version of this image. This approach might arguably be better because it uses an actual high resolution image, but it might not be accurate because it assumes that the relationship between T1-weighted features is the same as that for T2-weighted features (across scales). Thus, it may introduce features that are intrinsic to one modality and not to the other. Some disclosed embodiments avoid the premise that multiple scales are self-similar and avoid the use of an alternate tissue contrast with higher resolution.

III. Description of Embodiments, Advantages, and Innovations

It has been demonstrated that acquisition of rotated versions of multi-slice 2D magnetic resonance image stacks (or fully 3D acquisitions having one direction with poor resolution) can be used in SRR approaches to yield high resolution images. If the in-plane resolution of the acquired multi-slice images is adequate, then FBA can in principle be used to rapidly reconstruct these high-resolution images without using a highly ill-posed deconvolution step. But there is a need to avoid acquiring multiple image stacks. Thus, some embodiments exploit the fact that both high resolution and low resolution information exist in these types of magnetic resonance image acquisitions and to synthesize images with the same resolution as the acquired image volume but with a 3D PSF that is oriented in a different direction. The striking implications of this innovation are best illustrated through the following example.

Suppose a T2-weighted magnetic resonance acquisition with TE=50 ms and TR=2500 ms can excite 40 slices within a single TR. If the echo train length is eight then, assuming 384 phase encodes per image are needed, the total scan time to acquire these 40 slices is 120 s. If the desired field of view (in the z-direction) is 24 cm and the slice thickness is 2 mm, then 3 "slice packages" will be required, and the total scan time will be 360 s=6 min. Suppose the in-plane field of view is 19.2 cm and the matrix size is 384×384; then the resulting 3D image will have a resolution of 0.5×0.5×2.0 mm. To directly acquire this image at an isotropic resolution of 0.5×0.5×0.5 mm with the same signal-to-noise ratio using conventional (image averaging) methods would require 16 averages (since signal-to-noise goes up with the square root of the number of averages). In turn, this would require a scan sixteen times longer or 16×6 min=96 min, which is obviously impractical. Improvements in through-plane resolution by a factor of 4 (our scenario in this example) have been demonstrated with virtually no change in the signal-to-noise using ten rotated acquisitions together with the best SRR method available at the time. Therefore, the use of standard SRR can achieve isotropic resolution in this example in 10×6 min=60 min, which is better but still impractical. In contrast, some embodiments can produce a high resolution image at 0.5×0.5×0.5 mm isotopic resolution by acquiring only one low resolution image at 0.5×0.5×2.0 mm resolution—taking just six minutes to acquire—followed by reconstruction.

Further novel aspects of some embodiments are described presently. Some embodiments use the basic concept of rotated multi-image SRR but replace the regularized model-based deconvolution used by all previous methods with FBA in order avoid the noise prone deconvolution step. The synthesis of images with a rotated PSF is possible because the acquired low resolution image has examples of high resolution content (in the in-plane view), that a modern image synthesis algorithm exploits to create estimates of images with rotated PSFs as if they had been directly observed according to some embodiments. A benefit of this general approach is that image registration—a serious problem in conventional multi-image SRR—is unnecessary since the synthesized images are created by computational means and are therefore in perfect registration. Further, the acquired image serves as the atlas itself—no externally acquired atlas images are required according to some embodiments. Embodiments may therefore be applicable to any image contrast or image modality. This is important in SRR for magnetic resonance imaging because tissue contrasts are so flexible that atlases rarely have precisely the same tissue contrast as the acquired data. Yet further, some embodiments incorporate an anti-aliasing step (using a deep network) prior to super-resolution for 2D MRI. This permits such embodiments to apply to both 2D and 3D magnetic resonance image (when the data have anisotropic voxels).

Still further, note that SRR methods in medical imaging have been largely carried out on the head—i.e., in neuroimaging—because the brain is relatively rigid and it is therefore easier to register multiple acquisitions. But (for the same reason) image resolution in neuroimaging is already relatively better than that in cardiac imaging, so it is cardiac imaging where resolution enhancement is more critically needed. Some embodiments permit super-resolution to be carried out in cardiac imaging because only one multi-slice 2D or 3D acquisition is needed; in particular, some embodiments may image the coronary arteries. If successful, imaging of the coronary arteries may become routinely feasible with magnetic resonance imaging, eliminating the need for contrast computed tomography (and the associated contrast and x-ray dose), which is the current clinical standard for this application. Therefore, some embodiments provide not only a broadly applicable new method for resolution enhancement, but also facilitate an entirely new clinical application for magnetic resonance imaging.

Early embodiments are described in A. Jog, A. Carass, and J. L. Prince, "Self Super-Resolution for Magnetic Resonance Images," in *International Conference on Medical Image Computing and Computer-Assisted Intervention*, 2016, pp. 553-560; S. Goyal, C. Zhao, A. Jog, J. L. Prince, and A. Carass, "Improving self super resolution in magnetic resonance images," in Medical Imaging 2018: Biomedical Applications in Molecular, Structural, and Functional Imaging, 2018, p. 1057814; and C. Zhao, A. Carass, B. E. Dewey, and J. L. Prince, "Self super-resolution for magnetic resonance images using deep networks," in Biomedical Imaging (ISBI 2018), 2018 IEEE 15th International Symposium on, 2018, pp. 365-368. A description of advanced embodiments, that include innovations over the early embodiments, follows. Some advanced embodiments utilize a 2D fully-convolutional neural network (FCN) for image synthesis instead of a patch-based regression algorithm called Anchored Neighborhood Regression (ANR). With this change, image quality improved substantially (see preliminary results in FIG. 1, and below). However, some embodiments further adapt the process for 2D imaging and to significantly reduce computation time.

Figure 2:
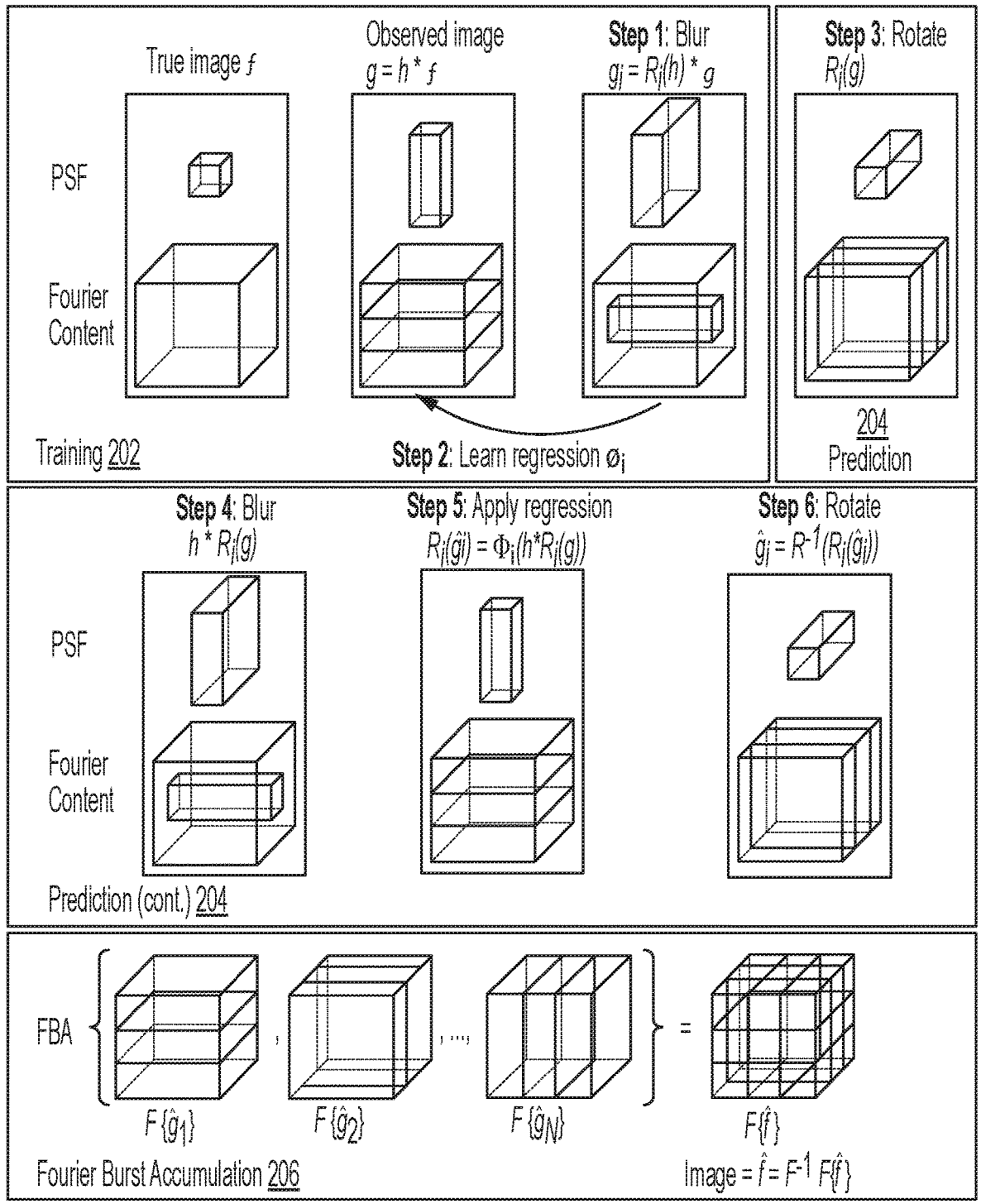
FIG. 2 schematically illustrates various embodiments that utilize six steps repeated N times followed by Fourier burst accumulation.

FIG. 2 schematically illustrates various embodiments that utilize six steps repeated N times followed by Fourier burst accumulation. In particular, FIG. 2 provides a graphical and mathematical overview of some embodiments. Consider the PSF (small cube) and Fourier content (large cube) of the desired high resolution image in the upper left of training block 202. The impulse response function h may be rotated by $R_i$ and applied to the observed image. An example, non-limiting description of a selection of steps performed by some embodiments follows. At step 1, let the observed image g be blurred in the vertical direction. Step 2 learns a regression $\phi_i$ from this image to the observed image. These two steps comprise the training 202 for this rotation. Next, as part of prediction 204, step 3 rotates the impulse response function h by $R_i$ and applies it to the observed image, and step 4 blurs the result by h. Steps 5 and 6 apply the learnt regression and the inverse rotation, yielding an estimate $\hat{g}_i$, which is a synthetic observation of f had it been blurred by a rotated version of h. Steps 1-6 comprise the image synthesis phase of some embodiments; these steps may be repeated for N different rotations. Any number of rotations may be used; some embodiments utilize between two and ten rotations; some embodiments utilize six.

Continuing the description of FIG. 2, Fourier burst accumulation block 206 shows taking the Fourier transforms of all N predicted $\hat{g}_i$ images and then combining them with *Fourier burst accumulation* (FBA) See M. Delbracio and G. Sapiro, "Removing Camera Shake via Weighted Fourier Burst Accumulation," *IEEE Transactions on Image Processing*, vol. 24, November 2015. FBA is based on the principle that images which are not blurred in a particular direction will have Fourier coefficients that are larger in magnitude than those of images that are blurred in that direction. Therefore, image restoration can be carried out by picking the Fourier coefficients with the largest magnitudes at each frequency bin. In some embodiments, the coefficients are smoothed in Fourier space and a robust maximum is used.

Some embodiments may replace the ANR of early embodiments with a fully convolutional neural network such as the enhanced deep residual network for single image super resolution ("EDSR") disclosed in B. Lim, S. Son, H. Kim, S. Nah, and K. M. Lee, "Enhanced deep residual networks for single image super-resolution," in *Computer Vision and Pattern Recognition Workshops (CVPRW)*, 2017 *IEEE Conference on*, 2017, pp. 1132-1140. EDSR is a single-image 2D fully convolutional neural network requiring training at multiple scales that shares parameters across scales.

Such embodiments may include super-resolution techniques, but not anti-aliasing techniques. Some embodiments use a self super-resolution (SSR) algorithm, which does not use any external atlas images, yet can still resolve high resolution images only reliant on the acquired low resolution image. Such embodiments may use a blurred version of the input image to create training data for a state-of-the-art super-resolution deep network. The trained network may be applied to the original input image to estimate the high resolution image. Experimental results indicate a significant improvement in through-plane resolution compared to competing SSR methods.

Figure 3:
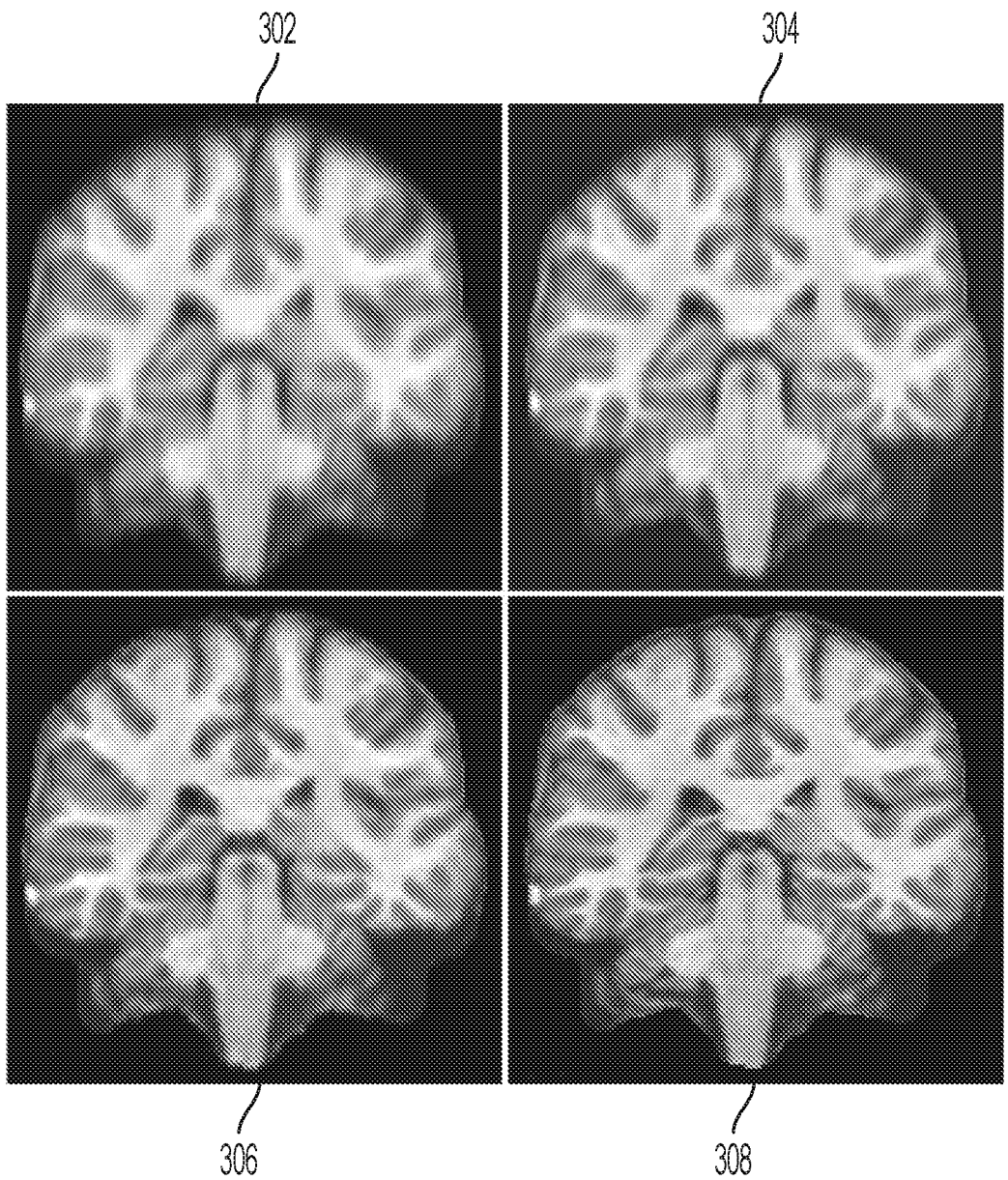
FIG. 3 shows a simulation example according to various embodiments, depicting a B-spline interpolation, an embodiment with anchored neighborhood regression, an embodiment with an enhanced deep residual network for single image super resolution, and the original high resolution image.

FIG. 3 shows a simulation example according to various embodiments, depicting a B-spline interpolation 302, an embodiment with anchored neighborhood regression 304, an embodiment with EDSR 306, and the original high resolution image 308. The depicted images are a result of acquiring a T1-weighted 1×1×1 mm MPRAGE image and blurring it using Fourier filtering to 1×1×3 mm. The image is then reconstructed using cubic B-splines (BSP) (see M. Unser, "Splines: A Perfect Fit for Signal and Image Processing," *IEEE Signal Processing Magazine*, vol. 16, pp. 22-38, November 1999), embodiments with ANR, and embodiments with EDSR. These same steps were applied to twenty such images to permit a statistical evaluation of performance. Table 1 below shows an evaluation of both the mean peak signal-to-noise ratio (PSNR) and mean SSIM. As shown, embodiments with EDSR are significantly better than the other methods (p<0.01, both one tailed t-tests and Wilcoxon rank sum tests).

TABLE 1

| Mean PSNR (dB) and SSIM | | | |
|---|---|---|---|
| Metric | BSP | ANR | EDSR |
| PSNR | 31.98 | 33.49 | 34.44* |
| SSIM | 0.9635 | 0.9678 | 0.9773* |

BSP = B-spline, ANR = embodiments with ANR synthesis, EDSR = embodiments with EDSR synthesis.
*indicates significance with p < 0.1.

Embodiments may be used to address T2-weighted magnetic resonance images acquired using a 2D magnetic resonance imaging protocol. In 3D magnetic resonance imaging, there are two phase encode directions, and the through-plane direction is defined to be the direction corresponding to the larger of the two voxel dimensions (assuming the data are not isotropic). In contrast, 2D magnetic resonance imaging uses only one phase encode direction and slice selection defines the through-plane direction. As a consequence, unless overlapping slices are used (and this is rare because it increases imaging time), aliasing is present in 2D magnetic resonance imaging but is entirely absent in 3D magnetic resonance imaging. Aliasing is produced by spatial under-sampling that causes overlapping spectral content in the sampled data. Although the slice profile permits minor anti-aliasing, it is not sufficient to prevent aliasing artifacts—which appear as high-frequency artifacts or textures that are not anatomical.

Some embodiments include an anti-aliasing deep network in advance of the basic network to reduce the effects of aliasing. Suppose that the in-plane resolution—i.e., full-width half-maximum ("FWHM")—is a while the through-plane resolution is b>a. Then orthogonal slices can be blurred from resolution a to b and downsampled to produce aliasing. In order to yield training data, these images may be upsampled using B-spline interpolation. Multiple orientations can be used to generate abundant training data. Different embodiments may utilize different patch sizes, including both 2D and 3D patches to train a fully convolutional neural network to remove aliasing. This result may then be fed into a fully convolutional neural network for super-resolution processing according to various embodiments.

Thus, some embodiments include both a self anti-aliasing (SAA) and self super-resolution (SSR) algorithm, neither of which need external training data. Such embodiments take advantage of the fact that the in-plane slices of magnetic resonance images contain high frequency information. Such embodiments may include the following three steps: 1) build a self anti-aliasing deep network, followed by 2) build a self super-resolution deep network (both may be applied along different orientations within the original images, and 3) recombine the multiple orientations output from steps 1 and 2 using Fourier burst accumulation. Such embodiments may include N4 inhomogeneity correction as a pre-processing step.

The Algorithm presented below may be used to implement such embodiments that include both SAA and SRR.

---

Algorithm

Data: $I_z(x, y, z)$ with spatial resolution $a \times a \times b$, $k = b/a$.
Result: estimate $\hat{I}(x, y, z)$ with spatial resolution $a \times a \times a$.
(Step 1) Construct Training Data:

for $n = 0, \ldots, 5; \theta := \dfrac{n\pi}{6}$ do

Rotate image in xy-plane: $I_z^\theta(x, y, z) := R_{xy}(\theta) \circ I_z(x, y, z)$;
    Define a 1D Gaussian filter $G_\sigma(x)$ with length round of (k), FWHM of k;
    Create $LR_2$ images: $I_{xz}^\theta(x, y, z) := I_z^\theta(x, y, z) * G_\sigma(x)$;
    Introduce aliasing in x-axis: $\tilde{I}_{xz}^\theta(x, y, z) := \uparrow_x^k (\downarrow_x^k (I_{xz}^\theta(x, y, z)))$.
end
Feed paired patches into EDSR model:
    from $[\tilde{I}_{xz}^\theta(x, y, z), I_{xz}^\theta(x, y, z)]$ to train an SAA;
    from $[\tilde{I}_{xz}^\theta(x, y, z), I_z^\theta(x, y, z)]$ to train an SSR.
(Step 2) SAA and SRR:
for $\alpha$ in $[0, \pi/2]$ do
    Rotate the image in the xy-plane: $I_z^\alpha(x, y, z) := R_{xy}(\alpha) \circ I_z(x, y, z)$;
    Apply trained SAA on xy-plane: $I_z^\alpha(x, z)_{SAA} := SAA \circ I_z^\alpha(x, z)$;
    Apply trained SSR on yz-plane: $\hat{I}^\alpha(y, z)_{SAA} := SSR \circ I_z^\alpha(y, z)_{SAA}$;
    Stack patches $\hat{I}^\alpha(y, z)$ to reconstruct $\hat{I}^\alpha(x, y, z)$.
end
(Step 3) Apply FBA on the collection of $\alpha$ results:
$\hat{I}(x, y, z) := FBA(\{\alpha: R_{xy}(-\alpha) \circ \hat{I}^\alpha(x, y, z)\})$.

---

A detailed explanation of the Algorithm follows. Consider an input low-resolution image having slice thickness equal to the slice separation. The spatial resolution (approximate full-width at half-maximum) and voxel separation of this image is assumed to be $a \times a \times b$ where $b > a$. This image is modeled as a low-pass filtered and downsampled version of the high-resolution image $\hat{I}(x, y, z)$ which has spatial resolution and voxel separation $a \times a \times a$. A first step is to apply cubic b-spline (BSP) interpolation to the input image, yielding $\hat{I}_z(x, y, z)$, which has the same spatial resolution $a \times a \times b$ as the input, but voxel separation $a \times a \times a$. Aliasing exists in the z direction in this image because the Nyquist criterion is not satisfied (unless the actual frequency content in the z direction is very low, which we assume is not the case in normal anatomies). Denote the ratio of the resolutions as $k = b/a$, which need not be an integer. For the Algorithm, 2D axial slices $I_z(x, y)$ can be thought of as $a \times a$ high-resolution slices, whereas sagittal slices $I_z(z, y)$ and coronal slices $I_z(z, x)$ are $b \times a$ low-resolution slices. Blurring axial slices in the x-direction produces $\tilde{I}_{xz}(x, y)$ with resolution of $b \times a$, which can be used with $I_z(x, y)$ as training data. Any trained system can then be applied to $I_z(z, y)$ or $I_z(z, x)$ to generate high-resolution sagittal and coronal slices. Some embodiments may use EDSR. Further details of the Algorithm are presented below.

Training Data Extraction: To construct the training data, some embodiments utilize aliased low-resolution slices $\tilde{I}_{xz}(x, y)$ that accurately simulate the resolution $b \times a$ and have aliasing in the x-axis. For 2D MRI, modeling the slice selection procedure may be used, thus we use a 1D Gaussian filter $G_\sigma(x)$ in the image domain with a length round(k) and full-width at half-maximum (FWHM) of k. The filtered image $I_{xz}(x, y, z)$ has the desired low-resolution components without aliasing. To introduce aliasing, the image may be downsampled by factor of k using linear interpolation to simulate the large slice thickness. Denote this image as $\downarrow_x^k(I_{xz}(x, y, z))$. To complete the training pair, some embodiments upsample this image by a factor of k using BSP interpolation to generate $LR_2$ which can be represented as $\uparrow_x^k(\downarrow_x^k(I_{xz}(x, y, z)))$, however, this disclosure will denote this as $\tilde{I}_{xz}(x, y, z)$. To increase the training samples, rotate $I_z(x, y, z)$ in the xy-plane by $\theta$ and repeat this process to yield $I_z^\theta(x, y, z)$. Some embodiments may use six rotations, where $\theta = n\pi/6$ for $n = 0, \ldots, 5$, but this may be generalized for any number and arrangement of rotations.

EDSR Model: Some embodiments train two networks, one for SAA and one for SSR. To train the SAA network, 32×32 patch pairs are extracted from axial slices in $\tilde{I}_{xz}(x, y, z)$ and $I_{xz}(x, y, z)$ (i.e., aliased $LR_2$ and LR, respectively). Train the state-of-the-art deep network super-resolution model, EDSR, to remove this aliasing. Use small patches to enhance edges without structural specificity so that this network can better preserve pathology. Additionally, small patches allow for more training samples. To train the SSR network, 32×32 patch pairs are extracted from axial slices in $\tilde{I}_z(x, y, z)$ and $I_z(x, y, z)$. These patch pairs train another EDSR model to learn how to remove aliasing and improve resolution. Although training may be done for every subject, fine-tuning a pre-trained model is accurate and fast. In practice, training the two models for one subject based on pre-trained models from an arbitrary data set takes less than forty minutes in total for a Tesla K40 GPU.

Figure 9:
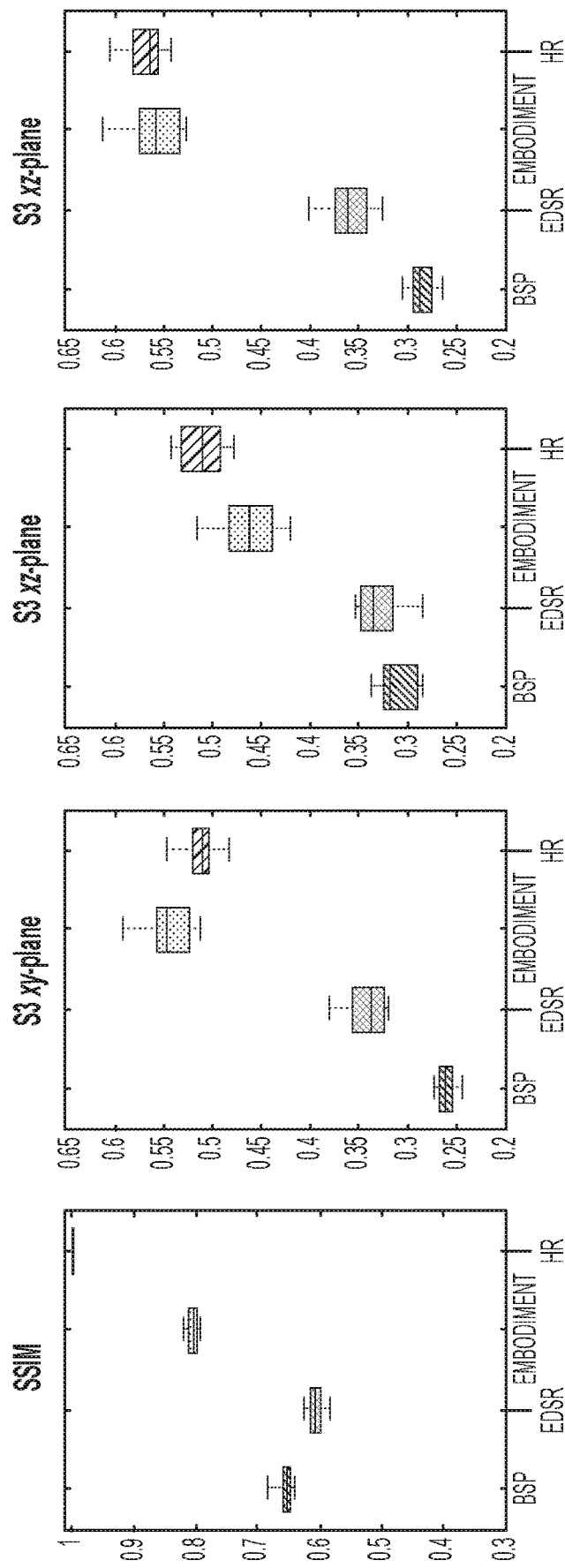
FIG. 9 depicts SSIM and S3 for a reconstruction result using three inputs (k=6), showing results from BSP, a magnetic resonance variant of EDSR, an embodiment, and the ground truth.
Figure 10:
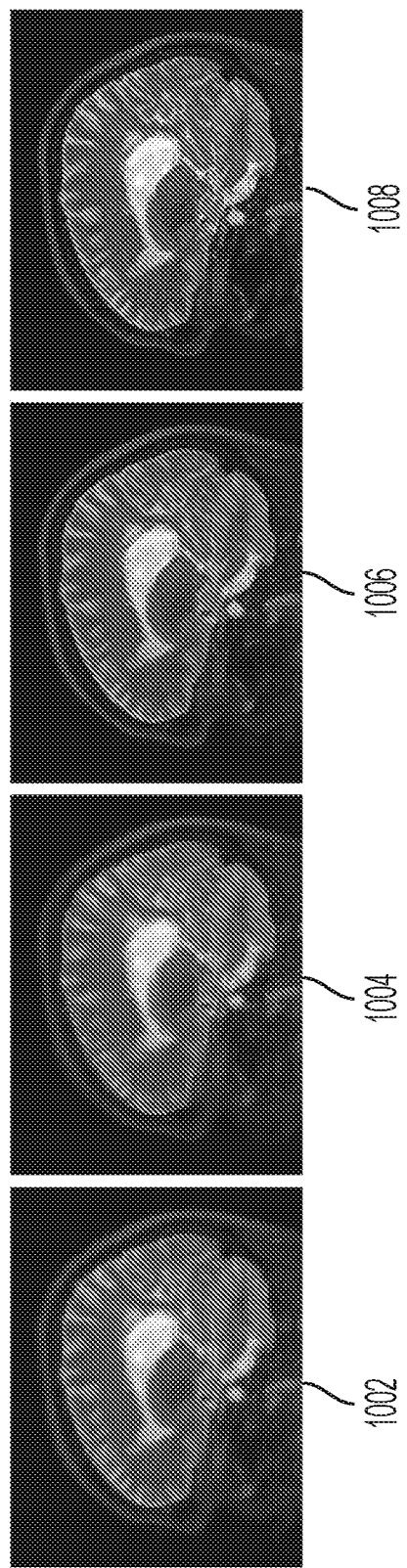
FIG. 10 depicts sagittal views of a reconstructed image using three inputs (k=6) from results of BSP, a magnetic resonance variant of EDSR, an embodiment, and the high-resolution ground truth image.

Applying the Networks: The trained SSR network can be applied to low-resolution coronal and sagittal slices of $I_z(x, y, z)$ to remove aliasing and improve resolution. However, experimentally it was discovered that applying the SSR network to patches of a sagittal slice $I_z(x, z)$ and subsequently reconstructing a 3D image results in only removes aliasing in sagittal slices. To address this, some embodiments apply the SAA network to coronal slices to remove aliasing there, and then apply the SSR network to sagittal slices. Subsequently, the aliasing in both the coronal and sagittal planes according to some embodiments are removed. This procedure may be repeated by applying SAA in sagittal slices and then SSR to the coronal slices to produce another image. As long as SAA and SSR are applied to orthogonal image planes, this may be done for any rotation $\alpha$ in the xy-plane. The SAA and SSR results are finally combined by taking the maximum value for each voxel in k-space for all rotations $\alpha$. This is the $l_\infty$ variant of Fourier burst accumulation (FBA), which assumes that high values in k-space indicate signal while low values indicate blurring. Because aliasing artifacts appears as high values in k-space, this assumption of FBA implicates the presently disclosed SAA network. Example results using an embodiment consistent with the Algorithm, using only two $\alpha$ values, 0 and $\pi/2$, are disclosed below in reference to FIGS. 4-7, 9, and 10. In particular, FIGS. 4 and 5 illustrate results using an example embodiment on simulated low-resolution data, FIGS. 6 and 7 illustrate results using an example embodiment on real low-resolution data, and FIGS. 9 and 10 illustrate results using an example embodiment for image reconstruction.

Figure 4:
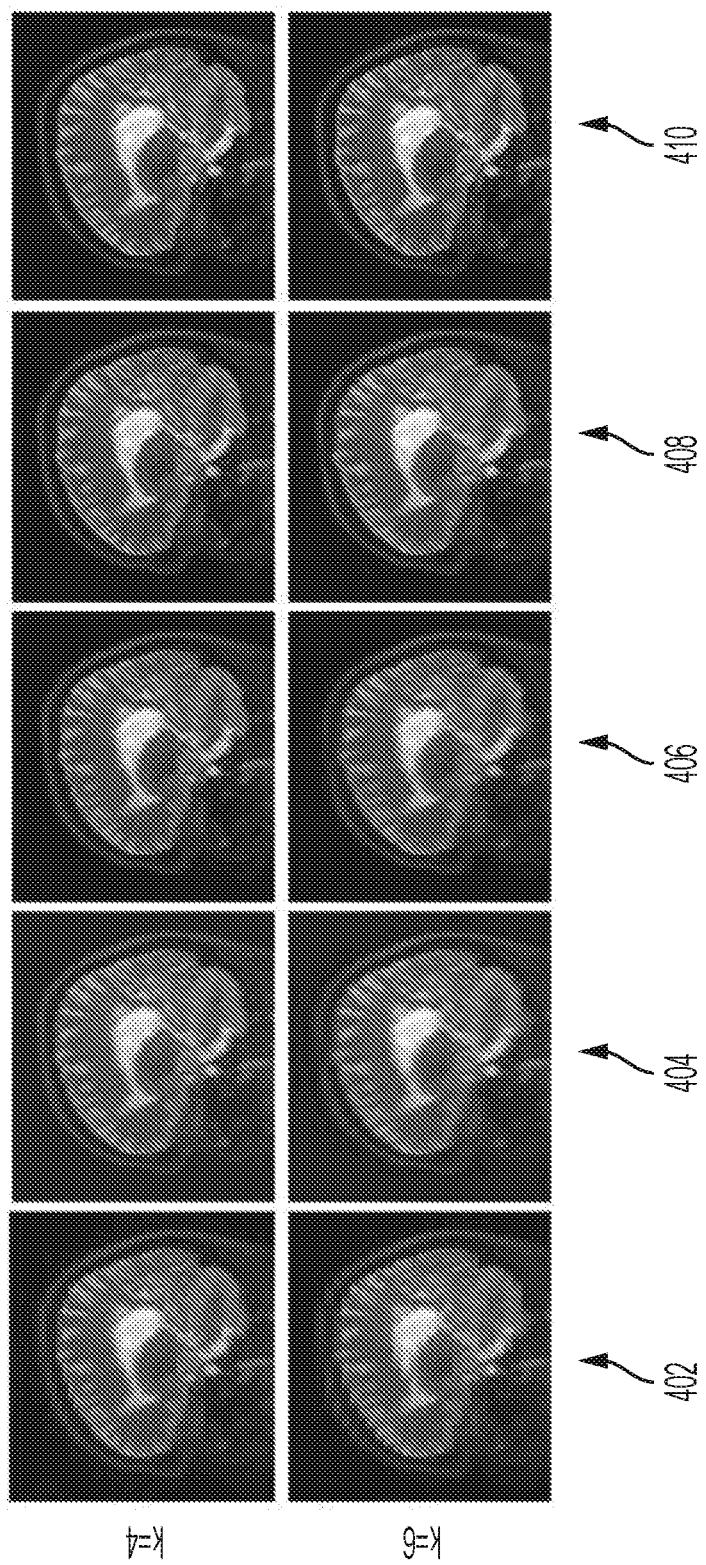
FIG. 4 depicts sagittal views of a k mm low-resolution image, a cubic B-spline (BSP) interpolated image, a magnetic resonance variant of EDSR, an image processed according to an embodiment, and a high-resolution ground truth image with lesions anterior and posterior of the ventricle.
Figure 5:
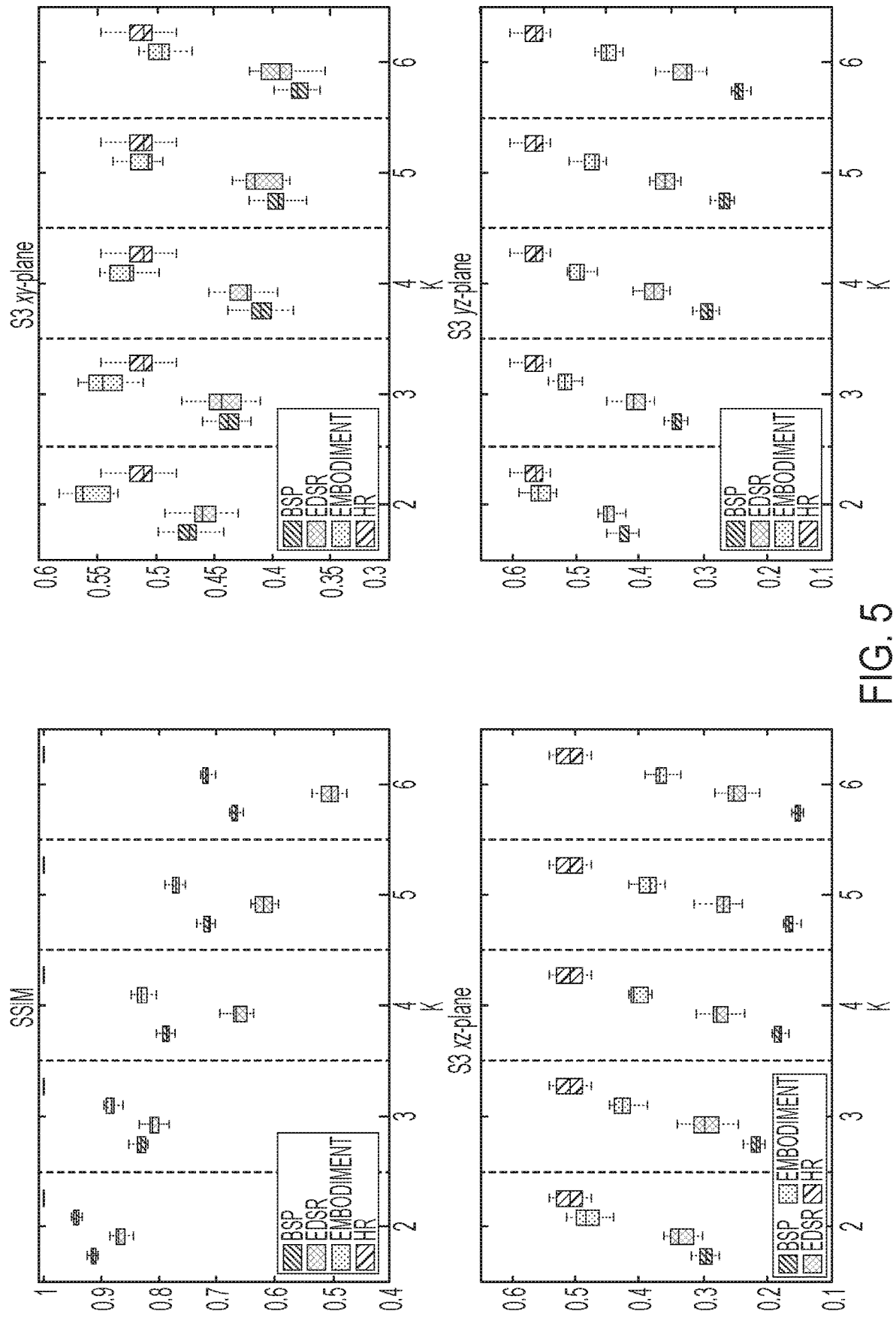
FIG. 5 depicts, for k=2, ..., 6, an evaluation of BSP, a magnetic resonance variant of EDSR, an image according to an embodiment, and the ground truth.

FIG. 4 depicts sagittal views of a k mm low-resolution image 402, a cubic B-spline (BSP) interpolated image 404, a magnetic resonance variant of EDSR 406, an image processed according to an embodiment 408, and a high-resolution ground truth image 410 with lesions anterior and posterior of the ventricle. In particular, FIG. 4 illustrates a comparison of results according to an embodiment to results according to an embodiment without SAA. The results are from $T_2$-weighted images from fourteen multiple sclerosis subjects imaged on a 3T Philips Achieva scanner with acquired resolution of 1×1×1 mm. These images serve as ground truth high-resolution images, which are blurred and downsampled by factor k={2, . . . , 6} in the z-axis to simulate thick-slice magnetic resonance images.

Visually, results 408 according to an embodiment have significantly better through-plane resolution than BSP 404 and EDSR 406. For the embodiment results 408, the lesions near the ventricle are well preserved when k=4. With k=6, the large lesions are still well preserved, but smaller lesions are not as well preserved. The Structural SIMilarity (SSIM) index is computed between each method and the 1×1×1 mm ground truth. And the mean value masked over non-background voxels is shown in FIG. 5. The sharpness index S3 (see Vu, C. T., Chandler, D. M., *S3: A spectral and spatial sharpness measure*, Advances in Multimedia, 2009, MME-DIA'09, pp. 37-43, IEEE (2009)), a no-reference 2D image quality assessment, was also computed, along each cardinal axis, as shown in FIG. 5. Thus, FIG. 5 depicts, for k=2, . . . , 6, an evaluation of BSP, a magnetic resonance variant of EDSR, an image according to an embodiment, and the ground truth. Results 408 according to an embodiment as shown in FIG. 4 are significantly better than results according to the alternative methods.

Figure 6:
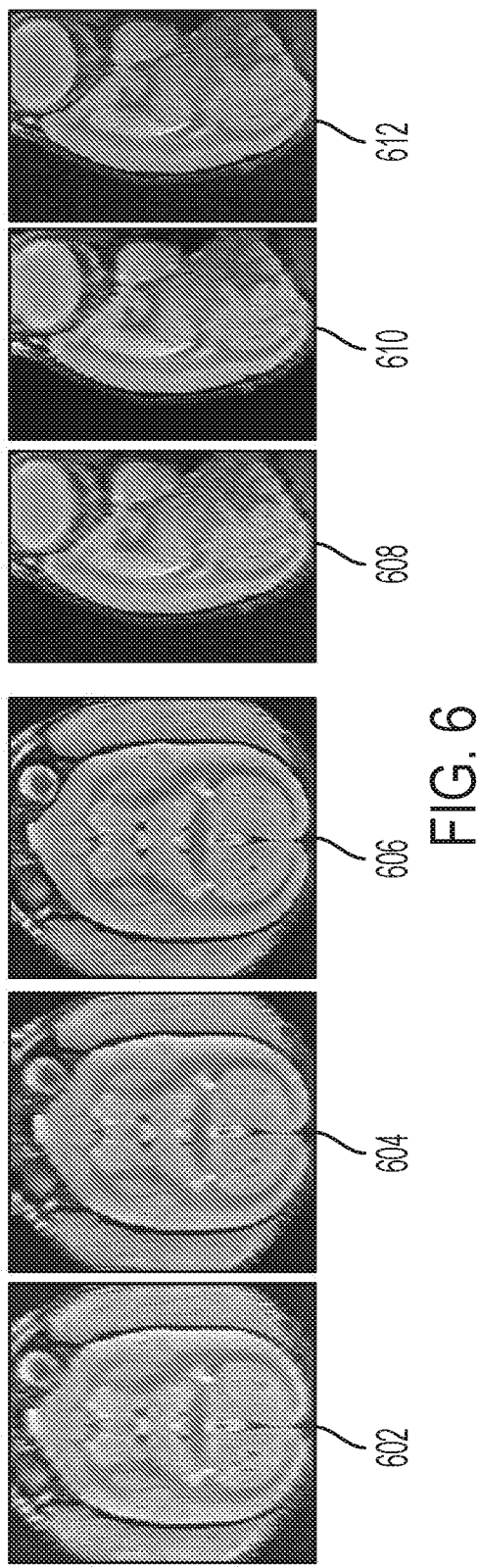
FIG. 6 depicts an experiment on a 0.15×0.15×1 mm low-resolution marmoset PD MRI, showing axial views of a BSP interpolated image, a magnetic resonance variant of EDSR, and an embodiment, and sagittal views of BSP, a magnetic resonance variant of EDSR, and an embodiment.
Figure 7:
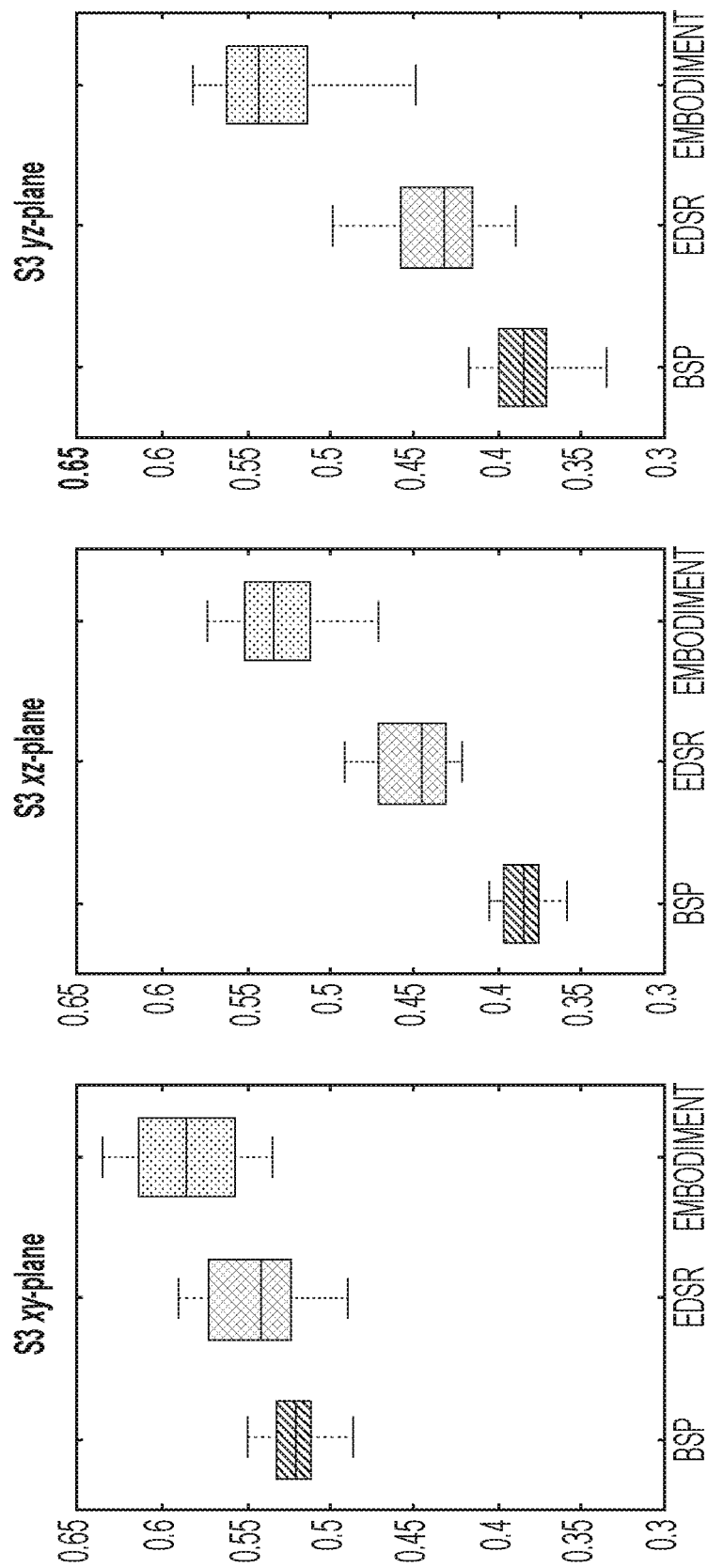
FIG. 7 shows S3 evaluation for the 0.15×0.15×1 marmoset data of FIG. 6, with BSP, a magnetic resonance variant of EDSR, and an embodiment.

FIG. 6 depicts an experiment on a 0.15×0.15×1 mm low-resolution marmoset PD MRI, showing axial views of a BSP interpolated image 602, a magnetic resonance variant of EDSR 604, and an embodiment 606, and sagittal views of BSP 608, a magnetic resonance variant of EDSR 610, and an embodiment 612. The experiment applied BSP, the disclosed magnetic resonance variant of EDSR, and a method according to the Algorithm, on eight PD-weighted magnetic resonance images of marmosets. Each image has a resolution of 0.15×0.15×1 mm (thus k≈6.667), with high resolution in the coronal plane. Results are shown in FIG. 6. Note the severe aliasing on the axial and sagittal plane of the input images, with an example shown at 602 and 608. Although there is no ground truth, visually, the embodiment removes the aliasing and gives a significantly sharper image (see 606 and 612). To evaluate the sharpness, the S3 sharpness measure was used on these results (see FIG. 7). Thus, FIG. 7 shows S3 evaluation for the 0.15×0.15×1 marmoset data of FIG. 6, with BSP, a magnetic resonance variant of EDSR, and an embodiment.

Figure 8:
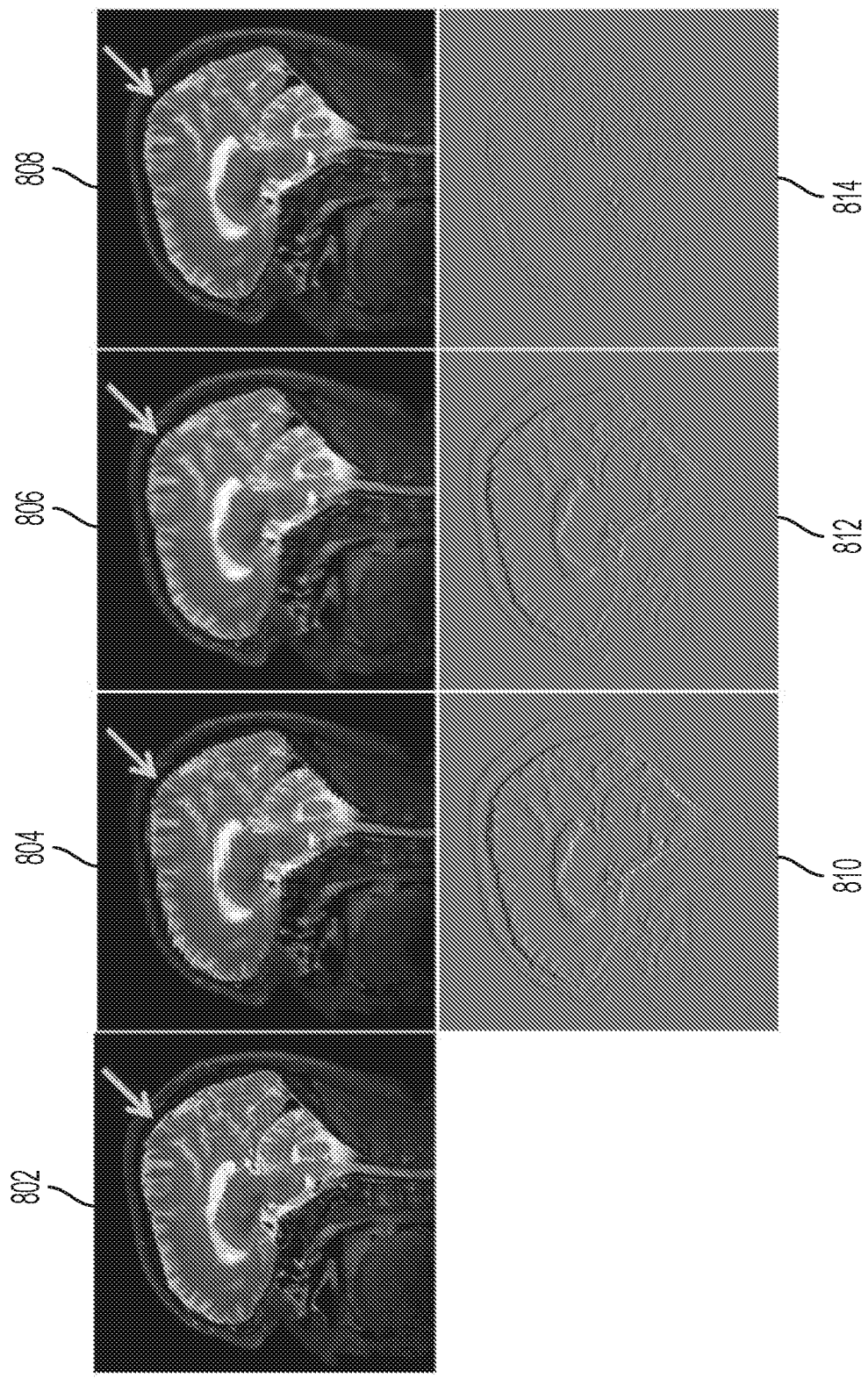
FIG. 8 illustrates an original 1×1×1 mm image, a simulated 1×1×4 mm image, a result according to an embodiment without anti-aliasing, a result according to an embodiment with anti-aliasing, and difference images between the reconstructions and the original.

FIG. 8 illustrates an original 1×1×1 mm image 802, a simulated 1×1×4 mm image 804, a result according to an embodiment without anti-aliasing 806, a result according to an embodiment with anti-aliasing 808, and images 810, 812, 814, showing difference images between the reconstructions and the original, where the arrows indicate a region where both super-resolution and anti-aliasing are very apparent. The results of FIG. 8 are from an embodiment that utilizes a modified 2D EDSR FCN trained as described herein for anti-aliasing. Patches sized 32×32 voxels were used, acquired from six rotated images that were resampled to produce aliased training data. To test this network, a 1×1×4 mm 2D acquisition was simulated from a 1×1×1 mm data set. An embodiment with SRR was applied directly to the volume and also after the anti-aliasing network was applied.

Embodiments may be used for image reconstruction. FIGS. 9 and 10 illustrate an example of such usage.

FIG. 9 depicts SSIM and S3 for a reconstruction result using three inputs (k=6), showing results from BSP, a magnetic resonance variant of EDSR, an embodiment, and the ground truth. In particular, FIG. 9 depicts an application of an embodiment to image reconstruction. Woo, J., Murano, E. Z., Stone, M., Prince, J. L., *Reconstruction of high-resolution tongue volumes from MRI*, IEEE Transactions on Biomedical Engineering 59(12), pp. 3511-3524 (2012) presented a high-resolution image reconstruction algorithm that reconstructs a single high-resolution image from three orthogonally acquired low-resolution images. The original algorithm used BSP interpolated low-resolution images as input. FIG. 9 illustrates a comparison using BSP for this reconstruction with the magnetic resonance variant of EDSR and an embodiment. The comparison uses the same data as was used for FIGS. 4-7, which have ground truth high-resolution images. Three simulated low-resolution images with resolution of 6×1×1, 1×6×1, and 1×1×6 were generated for each data set. Thus k=6 and the input images were severely aliased. Each of BSP, EDSR, and an embodiment were applied to these three images and then an implementation of the reconstruction technique of Woo et al. was applied. Example results for each of these three approaches are shown in FIG. 10. That is, FIG. 10 depicts sagittal views of a reconstructed image using three inputs (k=6) from results of BSP 1002, a magnetic resonance variant of EDSR 1004, an embodiment 1006, and the high-resolution ground truth image 1008. SSIM is computed for each reconstructed image to its 1×1×1 mm ground truth high-resolution image, with the mean of SSIM over non-background voxels being shown in FIG. 9. The sharpness index S3 was also computed, along each cardinal axis with the results also shown in FIG. 9. As shown, embodiments significantly outperform the competing techniques.

Embodiments may have advantageous speed characteristics. Some embodiments dramatically reduce computation time compared with prior art techniques, in order to approach clinical feasibility. Total computation time for some past embodiments for a single volume is 25-30 minutes (with anti-aliasing) including the following steps: create anti-aliasing training data (1.5 min), train anti-aliasing network (3.5 min), create two anti-aliased images (sagittal and coronal, 5-8 min), create super-resolution training data (1.5 min), train super-resolution network (6.5 min), create two super-resolution images (5-8 min), and apply FBA (negligible). Clinical feasible time is on the order of 5-10 minutes total so that the super-resolution images are available shortly after the scan is complete. Without anti-aliasing, past embodiments may take 13-16 minutes. Because the process of such past embodiments runs on an NVidia K80 GPU, a newer technology—e.g., GTX 1080—will improve the speed. The use of a pretrained network also improves speed, (a 7 minute speedup is expected) particularly if a contrast that is very close to what is acquired. Finally, some past embodiments use a total of three minutes for creation of training data, a process that may be hastened by more efficient coding. Embodiments are expected to achieve speed improvements of up to 16 times in comparison to prior art techniques.

IV. Example Applications of Various Embodiments

Note that although the present disclosure is applicable to, and focuses on, magnetic resonance imaging, embodiments are not so limited. Embodiments may be used to process essentially any three-dimensional image data that is acquired in slices. Examples include computed tomography and fluorescence microscopy. Further, embodiments are particularly advantageous for imaging the heart.

Some embodiments may be used to image the coronary arteries, where higher resolution images will have a greater clinical impact than other types of cardiac imaging. Some embodiments utilize a robust balanced SSFP pulse sequence at 3.0 T for coronary magnetic resonance angiography (CMRA). This sequence takes approximately twenty seconds during a breath-hold to yield a field of view of 300×300×20 mm with an acquired resolution of 1.0×1.0×2.0 mm (reconstructed to 0.8×0.8×1.0 mm voxels). Some embodiments modify the sequence to improve the in-plane resolution at the expense of through-plane resolution. For example, 0.9×0.9×2.5 mm has approximately the same noise per voxel; using an embodiment to improve through-plane resolution by a factor of 2.77 would yield an isotropic resolution of 0.9×0.9×0.9 mm, which is better resolution than currently achievable.

Figure 11:
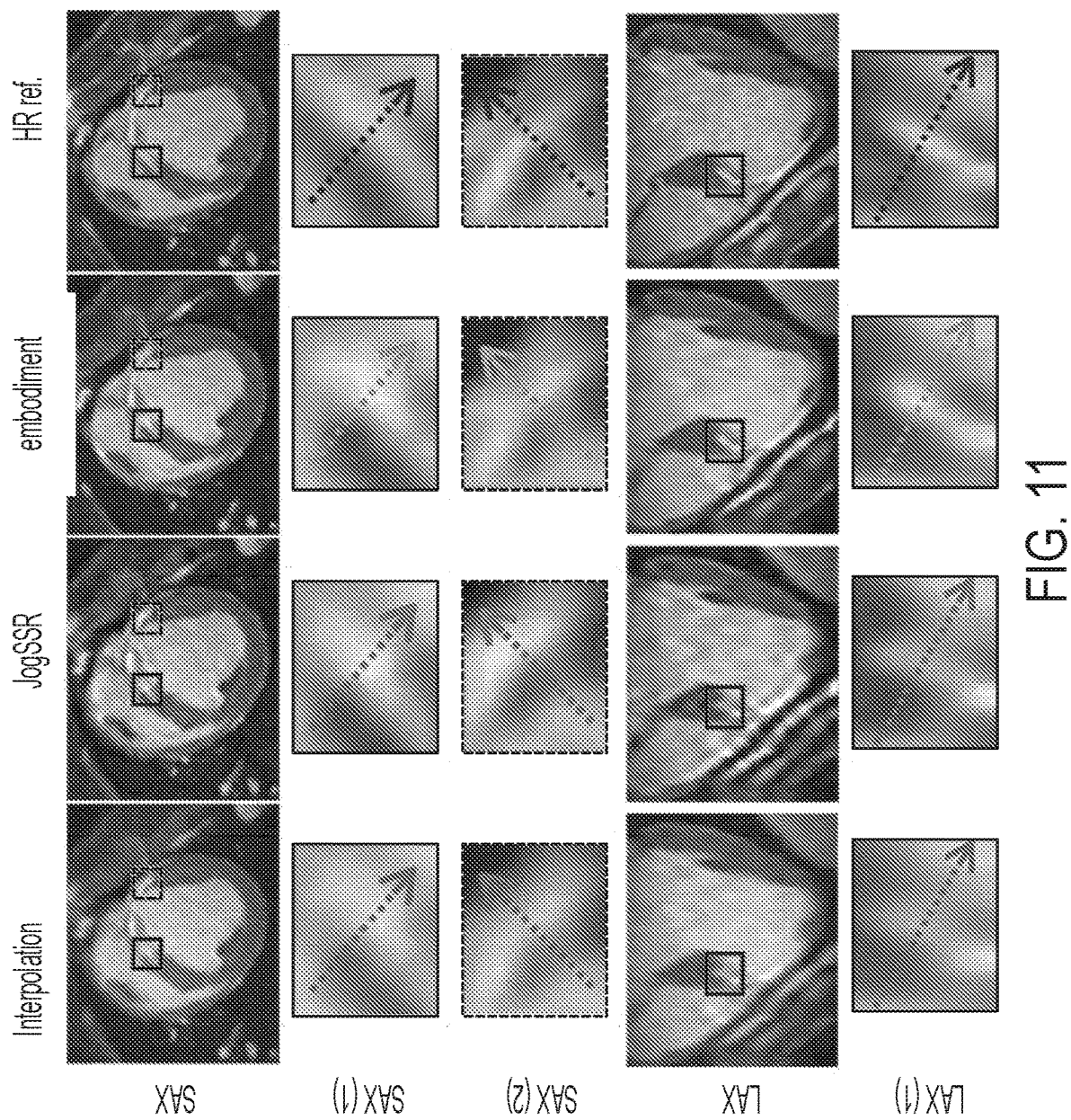
FIG. 11 illustrates an application of an embodiment to visual enhancement for scarring in cardiac left ventricular remodeling.
Figure 11:
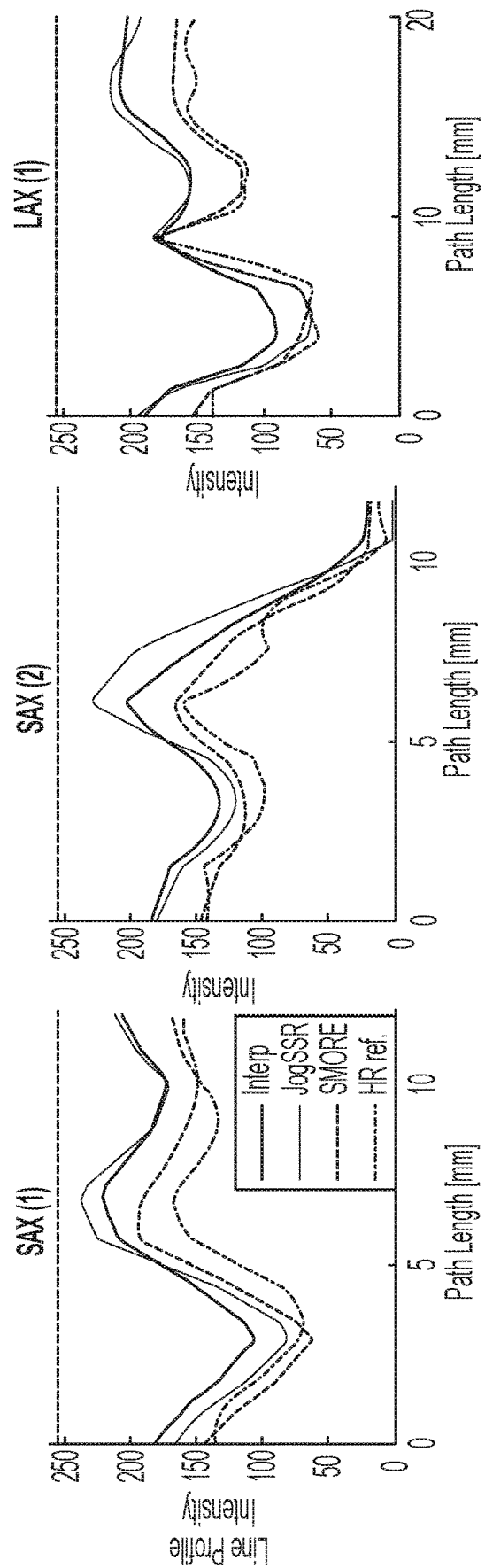

FIG. 11 illustrates an application of an embodiment to visual enhancement for scarring in cardiac left ventricular remodeling. In particular, FIG. 11 shows late gadolinium enhancement (LGE) from an infarct swine subject. The short-axis (SAX) and long-axis (LAX) views are arranged in columns using a 1.1×1.1×1.1 mm digital grid. The output of (1) sinc-interpolation, (2) JogSSR and (3) an embodiment for the subject low-resolution image were acquired at 1.1× 1.1×5 mm. The (4) sinc-interpolated high-resolution reference image for comparison was acquired at 1.1×1.1×2.2 mm. SAX(1) and LAX(1) boxes contain a thinning layer of enhanced midwall scar between endo- and epi layers of normal myocardium (hypo-intense). SAX(2) boxes contain a thin layer of normal myocardium (hypo-intense) between scar and epicardial fat (both hyper-intense). In each box, a path across the region of interest was picked, shown as arrows, and the profiles in the last row plotted.

The application to visual enhancement for scarring in cardiac left ventricular remodeling tested whether super-resolved images can give better visualization of the scarring caused by left ventricular remodeling after myocardial infarction than the acquired images. Two T1-weighted MR images from an infarcted pig were acquired, each with a different through-plane resolution. One image, which serves as the high-resolution reference image, was acquired with resolution equal to 1.1×1.1×2.2 mm, and then it was sinc interpolated on the scanner (by zero padding in k-space) to 1.1×1.1×1.1 mm. The other image was acquired with resolution equal to 1.1×1.1×5 mm. Both of these images were acquired with a 3D protocol, inversion time=300 ms, flip angle=25°, TR=5.4 ms, TE=2.5 ms, and GRAPPA acceleration factor R=2. The high-resolution reference image has a segmented centric phase-encoding order with 12 k-space segments per imaging window (heart beat), while the low-resolution subject image has 16 k-space segments.

The application performed sinc interpolation, JogSSR, and applied an embodiment to the 1.1×1.1×5.0 mm data using a 1.1×1.1×1.1 mm digital grid. These images were then rigidly registered to the reference image for comparison. The regions of thinning layer of midwall scar between the endocardial and epicardial layers of normal myocardium and the thin layer of normal myocardium between the scar and epicardial fat were examined. These two regions of interest are cropped and zoomed to show the details.

A thin layer of the midwall scar between the endocardium and epicardium of normal myocardium appears as bright strip in the boxes with solid boundary lines. A thin layer of normal myocardium between scar and epicardial fat appears as dark strip in the boxes with dotted boundary lines. They are zoomed in to show the details below the short-axis (SAX) slices with acquired resolution of 1.1×1.1 mm and long-axis (LAX) slices with originally acquired resolution of 1.1×5 mm for the first three columns, or 1.1×2.2 mm for the column of "HR ref." Each zoomed box contains an arrow that depicts a line segment. The corresponding line profiles are shown on the bottom.

As seen in the long-axis (LAX) images and zoomed regions, the borders between normal myocardium, enhanced scar and blood are significantly clearer in the embodiment as compared with JogSSR and interpolation. The intensity profile for the embodiment very closely matches that of the high-resolution reference image. For the short-axis (SAX(1) and SAX(2)), the resolution was already high and there is less to be gained. Nevertheless, it is apparent that the image clarity is slightly improved by the embodiment while faithfully representing the patterns from the input images.

Furthermore, the experiment computed the SSIM and PSNR between each method and high-resolution reference image. The SSIM for interpolation, JogSSR, and the embodiment results are 0.5070, 0.4770, and 0.5146, correspondingly. The PSNR for interpolation, JogSSR, and the embodiment are 25.8816, 24.4142, and 25.3002, correspondingly. Note that the embodiment gives the best SSIM.

Figure 12:
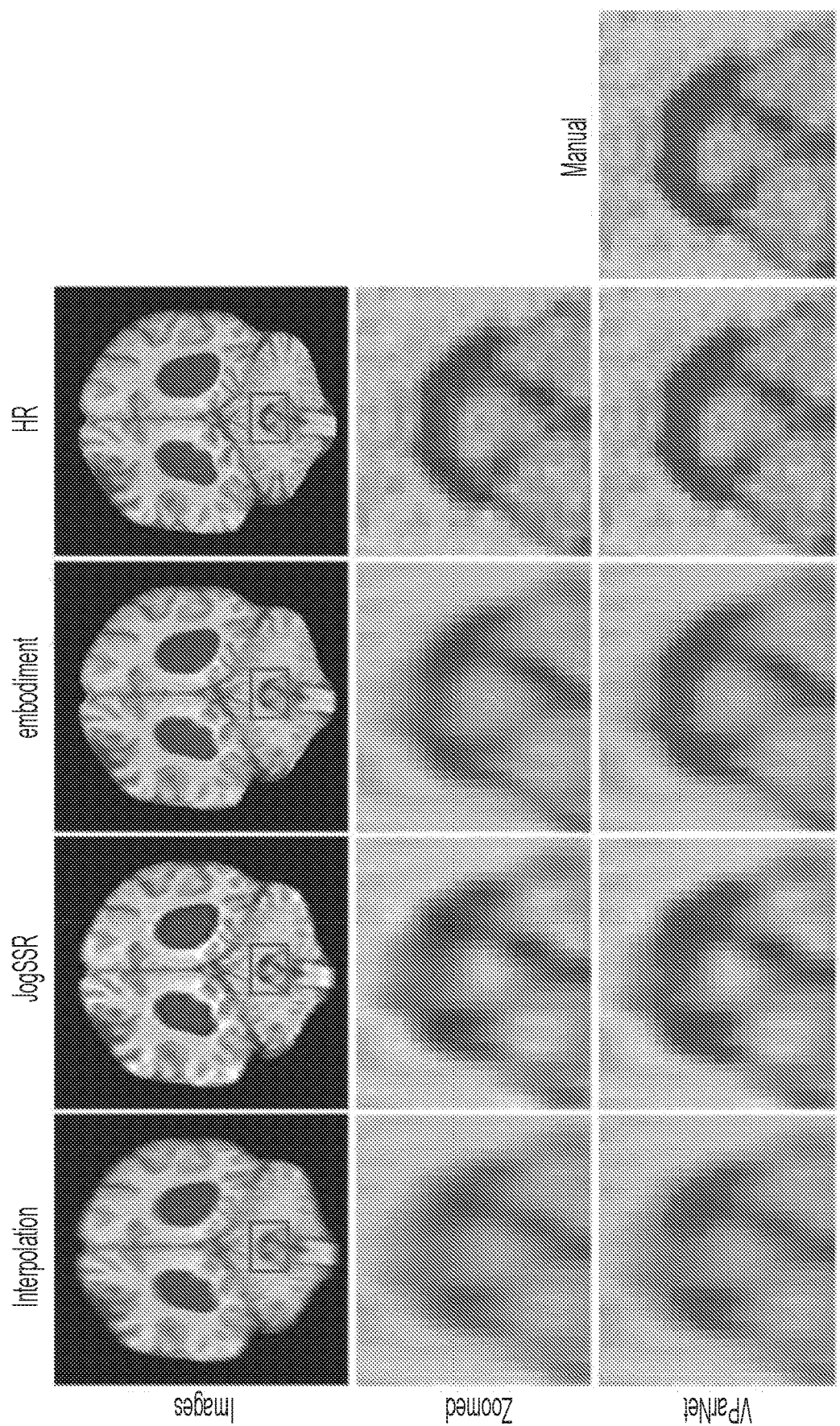
FIG. 12 depicts an application to brain ventricle parcellation.

FIG. 12 depicts an application to brain ventricle parcellation. This experiment demonstrates the effect of super-resolution on brain ventricle parcellation and labeling using the Ventricle Parcellation Network (VParNet) described in Shao M, Han S, Carass A, Li X, Blitz A M, Prince J L, et al., Shortcomings of ventricle segmentation using deep convolutional networks, Understanding and interpretingmachine learning in medical image computing applications, pp. 79-86, Springer (2018). In particular, the experiment tested whether super-resolved images can give better VParNet results than images from either interpolation or JogSSR. The data for this experiment were from an NPH data set containing 95 T1-w MPRAGE MRIs (age range: 26-90 years with mean age of 44.54 years). They were acquired on a 3 T Siemens scanner with scanner parameters: TR=2110 ms, TE=3.24 ms, FA=8°, TI=1100 ms, and voxel size of 0.859× 0.859×0.9 mm. There were also fifteen healthy controls from the Open Access Series on Imaging Studies (OASIS) dataset involved in this experiment. All the MRIs were interpolated to a 0.8×0.8×0.8 mm digital grid, and then pre-processed using N4-bias correction, rigid registration to MNI 152 atlas space, and skull-stripping.

VParNet was trained to parcellate the ventricular system of the human brain into its four cavities: the left and right lateral ventricles (LLV and RLV), and the third and the fourth ventricles. It was trained on 25 NPH subjects and 15 healthy controls (not involved in the evaluations). In the original experiment of Shao et al., the remaining 70 NPH subjects were used for testing. The present experiment downsampled the 70 NPH subject images first so that the impact of super-resolution could be studied. In order to remove the impact of pre-processing, the experiment downsampled the 70 pre-processed test datasets instead of the raw datasets. In particular, the experiment downsampled the data to a resolution of 0.8×0.8×0.8 r mm following a 2D acquisition protocol, where r is the through-plane to in-plane resolution ratio. The slice number of the high-resolution images happens to be a prime number. Since the downsampled images must have integer slice numbers, the downsample ratio r which is also the ratio between the slice number of high-resolution images and downsampled images must be non-integers. The experiment chose a ratio r of 1.50625, 2.41, 3.765625, 4.82, 6.025. The downsampled images have voxel length (0.8 r mm) in z-axis of 1.205 mm, 1.928 mm, 3.0125 mm, 3.856 mm, 4.82 mm. To apply VParNet, which was trained on 0.8×0.8×0.8 mm images, to these downsampled images, the experiment used cubic b-spline interpolation, JogSSR, and an embodiment to produce images on a 0.8×0.8×0.8 mm digital grid. These images were then used in the same trained VParNet to yield ventricular parcellation results.

The high-resolution NPH images have physical resolution in z-axis of 0.9 mm. They were used as ground truth, and the accuracy of the superresolved images was evaluated using the Structural Similarity Index (SSIM) and the Peak Signal to Noise Ratio (PSNR) within brain masks. As for the ventricle parcellation performance, the experiment evaluated the automated parcellation results using manual delineations. The experiment computed Dice coefficients to evaluate the parcellation accuracy of the same network on different super-resolved and interpolated images. By comparing the parcellation accuracy, the experiment evaluates how much improvement is available from an embodiment compared with interpolation.

The low-resolution image depicted in FIG. 12 using cubic-b-spline interpolation has resolution 0.8×0.8×3.856 mm low resolution while the ground truth image has resolution 0.859×0.859×0.9 mm. The JogSSR and embodiment results are also shown. To reveal more detail, the second row shows zoomed images of the fourth ventricle, where the zoomed region is shown using blue boxes in the first row. The VParNet parcellations as well as the manually delineated label of the fourth ventricle are shown using purple voxels on the third row. Visually, of all the results derived from the low-resolution data, the embodiment gives the best super-resolution and parcellation results. In particular, the VParNet parcellation on the embodiment result is very close to the VParNet on the high-resolution image.

These results were evaluated quantitatively. The mean values of SSIM and PSNR are shown in Table 2, below. Paired two-tail Wilcoxon signed-rank tests were performed between results from interpolation, JogSSR, and the embodiment. The '*' ($p<0.005$) and '†' ($p<0.05$) indicate the method is significantly better than the other two methods. The SR results from the embodiment are always significantly more accurate than interpolation and JogSSR, with SSIM and PSNR as accuracy metrics. For images with thickness of 1.205 mm, the significance is weak, indicating that the improvement is not dramatic. For images with thicker slices, the significance is strong, and therefore the improvement is large. The Dice coefficient of the parcellation results of the four cavities (RLV, LLV, 3rd, 4th) and the whole ventricular system are also shown in Table 2. From Table 2, for example, it is apparent that VParNet on the embodiment results of thickness 4.82 mm is better than interpolation results of 3.856 mm, while the later needs 56.25% longer scanning time. It shows the potential of reducing scanning time by using the embodiment.

TABLE 2

| Metric | Thickness | Interp. | JogSSR | Embodiment | HR(0.9 mm) |
|---|---|---|---|---|---|
| SSIM | 1.205 mm | 0.9494 | 0.9507 | 0.9726* | 1* |
| | 1.928 mm | 0.9013 | 0.9106 | 0.9389* | |
| | 3.0125 mm | 0.8290 | 0.8400 | 0.8893* | |
| | 3.856 mm | 0.7677 | 0.7812 | 0.8387* | |
| | 4.82 mm | 0.7003 | 0.7170 | 0.7817* | |
| PSNR | 1.205 mm | 35.0407 | 34.0472 | 39.5053* | — |
| | 1.928 mm | 31.9321 | 30.6444 | 35.7429* | |
| | 3.0125 mm | 29.2785 | 27.4384 | 31.9878* | |
| | 3.856 mm | 27.7562 | 25.7118 | 29.6050* | |
| | 4.82 mm | 26.4127 | 24.2377 | 28.1593* | |
| Dice(RLV) | 1.205 mm | 0.9704 | 0.9705 | 0.9712† | 0.9715* |
| | 1.928 mm | 0.9678 | 0.9690 | 0.9706* | |
| | 3.0125 mm | 0.9610 | 0.9635 | 0.9693* | |
| | 3.856 mm | 0.9527 | 0.9578 | 0.9648* | |
| | 4.82 mm | 0.9405 | 0.9498 | 0.9629* | |
| Dice(LLV) | 1.205 mm | 0.9710 | 0.9709 | 0.9715† | 0.9717† |
| | 1.928 mm | 0.9690 | 0.9693 | 0.9710* | |
| | 3.0125 mm | 0.9638 | 0.9641 | 0.9699* | |
| | 3.856 mm | 0.9571 | 0.9585 | 0.9663* | |
| | 4.82 mm | 0.9469 | 0.9510 | 0.9638* | |

TABLE 2-continued

| Metric | Thickness | Interp. | JogSSR | Embodiment | HR(0.9 mm) |
|---|---|---|---|---|---|
| Dice(3rd) | 1.205 mm | 0.9149 | 0.9149 | 0.9163† | 0.9174* |
| | 1.928 mm | 0.9095 | 0.9097 | 0.9141* | |
| | 3.0125 mm | 0.8945 | 0.8940 | 0.9073* | |
| | 3.856 mm | 0.8779 | 0.8761 | 0.8937* | |
| | 4.82 mm | 0.8560 | 0.8545 | 0.8832* | |
| Dice(4th) | 1.205 mm | 0.8954 | 0.8941 | 0.8973* | 0.8983* |
| | 1.928 mm | 0.8891 | 0.8851 | 0.8947* | |
| | 3.0125 mm | 0.8741 | 0.8657 | 0.8878* | |
| | 3.856 mm | 0.8550 | 0.8463 | 0.8753* | |
| | 4.82 mm | 0.8254 | 0.8216 | 0.8629* | |
| Dice(whole) | 1.205 mm | 0.9690 | 0.9690 | 0.9696† | 0.9699* |
| | 1.928 mm | 0.9665 | 0.9672 | 0.9690* | |
| | 3.0125 mm | 0.9602 | 0.9614 | 0.9675* | |
| | 3.856 mm | 0.9524 | 0.9552 | 0.9632* | |
| | 4.82 mm | 0.9408 | 0.9470 | 0.9607* | |

An evaluation of whether the parcellation results from high-resolution images are significantly better than for embodiment from images with thickness 1.205 mm was conducted. The column of "HR" of Table 2 shows results of paired two-tail Wilcoxon signed-rank tests between high-resolution and the results from the three methods. The '*' and '†' indicate that high-resolution images give significantly better evaluation values than the embodiment for thickness of 1.205 mm. The strong significance always holds, except for the Dice of LLV for which only weak significance holds. It shows that acquiring high-resolution images with adequate SNR gives better parcellation results than low-resolution images, even with the embodiment applied to improve spatial resolution. However, if the acquired data are already limited to be anisotropic low-resolution images, which is common in clinical and research, the embodiment can give better parcellation than interpolation.

Certain embodiments can be performed using a computer program or set of programs. The computer programs can exist in a variety of forms both active and inactive. For example, the computer programs can exist as software program(s) comprised of program instructions in source code, object code, executable code or other formats, firmware program(s), or hardware description language (HDL) files. Any of the above can be embodied on a transitory or non-transitory computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A method of electronically image processing three-dimensional image data using machine learning, the method comprising:
obtaining image data representing a plurality of slices parallel to a first plane in three-dimensional space;
constructing machine learning training data from the image data, wherein the constructing comprises, for each of a plurality of angles, at least one of rotating, blurring, and introducing aliasing;
training an anti-aliasing machine learning system with at least a portion of the machine learning training data, wherein a trained anti-aliasing machine learning system is produced;
training a super-resolution machine learning system with at least a portion of the machine learning training data, wherein a trained super-resolution machine learning system is produced;
processing the image data using the trained anti-aliasing machine learning system and the trained super-resolution machine learning system to produce processed image data, wherein the processing comprises:
applying the trained anti-aliasing machine learning system to the image data in a first plurality of planes perpendicular to the first plane, and
applying the trained super-resolution machine learning system to the image data in a second plurality of planes perpendicular to the first plane and perpendicular to the first plurality of planes; and
outputting the processed image data.

2. The method of claim 1, wherein the processing further comprises, for each of a plurality of rotations of the image data in the first plane to produce second rotated image data:
applying the trained anti-aliasing machine learning system to the second rotated image data in the first plurality of planes;
applying the trained super-resolution machine learning system to the second rotated image data in the second plurality of planes to produce rotated processed image data; and
combining the rotated processed image data for each of the second plurality of rotations to produce the processed image data.

3. The method of claim 1, wherein the image data comprises a plurality of anisotropic voxels.

4. The method of claim 1, wherein the blurring comprises applying a Gaussian filter.

5. The method of claim 1, wherein the rotating comprises rotating in the first plane, wherein the blurring comprises blurring in a dimension parallel to the first plane, and wherein the introducing aliasing comprises introducing aliasing in the dimension parallel to the first plane.

6. The method of claim 1, wherein the image data comprises one of magnetic resonance imaging image data, computed tomography image data, or fluorescence microscopy image data.

7. The method of claim 1, wherein at least one of the anti-aliasing machine learning system or the super-resolution machine learning system comprises a neural network.

8. The method of claim 1, further comprising preprocessing the image data using inhomogeneity correction.

9. The method of claim 1, wherein the outputting comprises displaying at least a portion of the processed image data on a computer monitor.

10. The method of claim 1, wherein at least one of the anti-aliasing machine learning system or the super-resolution machine learning system is pre-trained using pre-training data derived from pre-training image data, wherein the pre-training image data is different from the image data.

11. A system for electronic image processing of three-dimensional image data using machine learning, the system comprising at least one electronic processor that executes instructions to perform operations comprising:

obtaining image data representing a plurality of slices parallel to a first plane in three-dimensional space;

constructing machine learning training data from the image data, wherein the constructing comprises, for each of a plurality of angles, at least one of rotating, blurring, and introducing aliasing;

training an anti-aliasing machine learning system with at least a portion of the machine learning training data, wherein a trained anti-aliasing machine learning system is produced;

training a super-resolution machine learning system with at least a portion of the machine learning training data, wherein a trained super-resolution machine learning system is produced;

processing the image data using the trained anti-aliasing machine learning system and the trained super-resolution machine learning system to produce processed image data, wherein the processing comprises:

applying the trained anti-aliasing machine learning system to the image data in a first plurality of planes perpendicular to the first plane, and applying the trained super-resolution machine learning system to the image data in a second plurality of planes perpendicular to the first plane and perpendicular to the first plurality of planes; and outputting the processed image data.

12. The system of claim 11, wherein the processing further comprises, for each of a plurality of rotations of the image data in the first plane to produce second rotated image data:

applying the trained anti-aliasing machine learning system to the second rotated image data in the first plurality of planes;

applying the trained super-resolution machine learning system to the second rotated image data in the second plurality of planes produce rotated processed image data; and combining the rotated processed image data for each of the second plurality of rotations to produce the processed image data.

13. The system of claim 11, wherein the image data comprises a plurality of anisotropic voxels.

14. The system of claim 11, wherein the blurring comprises applying a Gaussian filter.

15. The system of claim 11, wherein the rotating comprises rotating in the first plane, wherein the blurring comprises blurring in a dimension parallel to the first plane, and wherein the introducing aliasing comprises introducing aliasing in the dimension parallel to the first plane.

16. The system of claim 11, wherein the image data comprises one of magnetic resonance imaging image data, computed tomography image data, or fluorescence microscopy image data.

17. The system of claim 11, wherein at least one of the anti-aliasing machine learning system or the super-resolution machine learning system comprises a neural network.

18. The system of claim 11, further comprising preprocessing the image data using inhomogeneity correction.

19. The system of claim 11, further comprising a computer monitor, wherein the outputting comprises displaying at least a portion of the processed image data on the computer monitor.

20. The system of claim 11, wherein at least one of the anti-aliasing machine learning system or the super-resolution machine learning system is pre-trained using pre-training data derived from pre-training image data, wherein the pre-training image data is different from the image data.

* * * * *